United States Patent [19]

Majzub

[11] Patent Number: 5,407,355

[45] Date of Patent: Apr. 18, 1995

[54] LETTER DISPLAY

[76] Inventor: Justin H. V. Majzub, Mill Ford Farm, Coughton, Nr. Alcester, Warwickshire, Great Britain

[21] Appl. No.: 5,977

[22] Filed: Jan. 19, 1993

Related U.S. Application Data

[63] Continuation of Ser. No. 639,062, Jan. 9, 1991, abandoned.

[30] Foreign Application Priority Data

Jan. 9, 1990 [GB] United Kingdom ................. 9000503

[51] Int. Cl.⁶ .............................................. G09B 1/40
[52] U.S. Cl. ..................................... 434/160; 434/157
[58] Field of Search ............... 434/159, 160, 170, 157, 434/156; 40/595, 596

[56] References Cited

U.S. PATENT DOCUMENTS 1,452,340  4/1923  Hubbard .............................. 434/160
3,315,376  4/1967  Nielsen ................................ 434/160
4,261,126  4/1981  Bezjian ................................. 40/447
4,344,626  8/1982  Wadland .

FOREIGN PATENT DOCUMENTS 482092   4/1952  Canada ............................... 434/159
248950   1/1926  United Kingdom .
700095  11/1953  United Kingdom .
1404790  9/1975  United Kingdom .

Primary Examiner—Richard J. Apley
Assistant Examiner—Karen A. Jalbert
Attorney, Agent, or Firm—Wenderoth, Lind & Ponack

[57] ABSTRACT

A method of, and a fount for, representing Arabic characters, C in number, of an alphabet numbering L letters (where C>L) by way of display characters generated from display components in which M (where M<L) of the display characters are represented per se; and the remaining N characters (where N=C−M) are unrepresented; the M display characters being a part of a display fount which is adapted for transformation to generate the N remaining display characters.

6 Claims, 31 Drawing Sheets

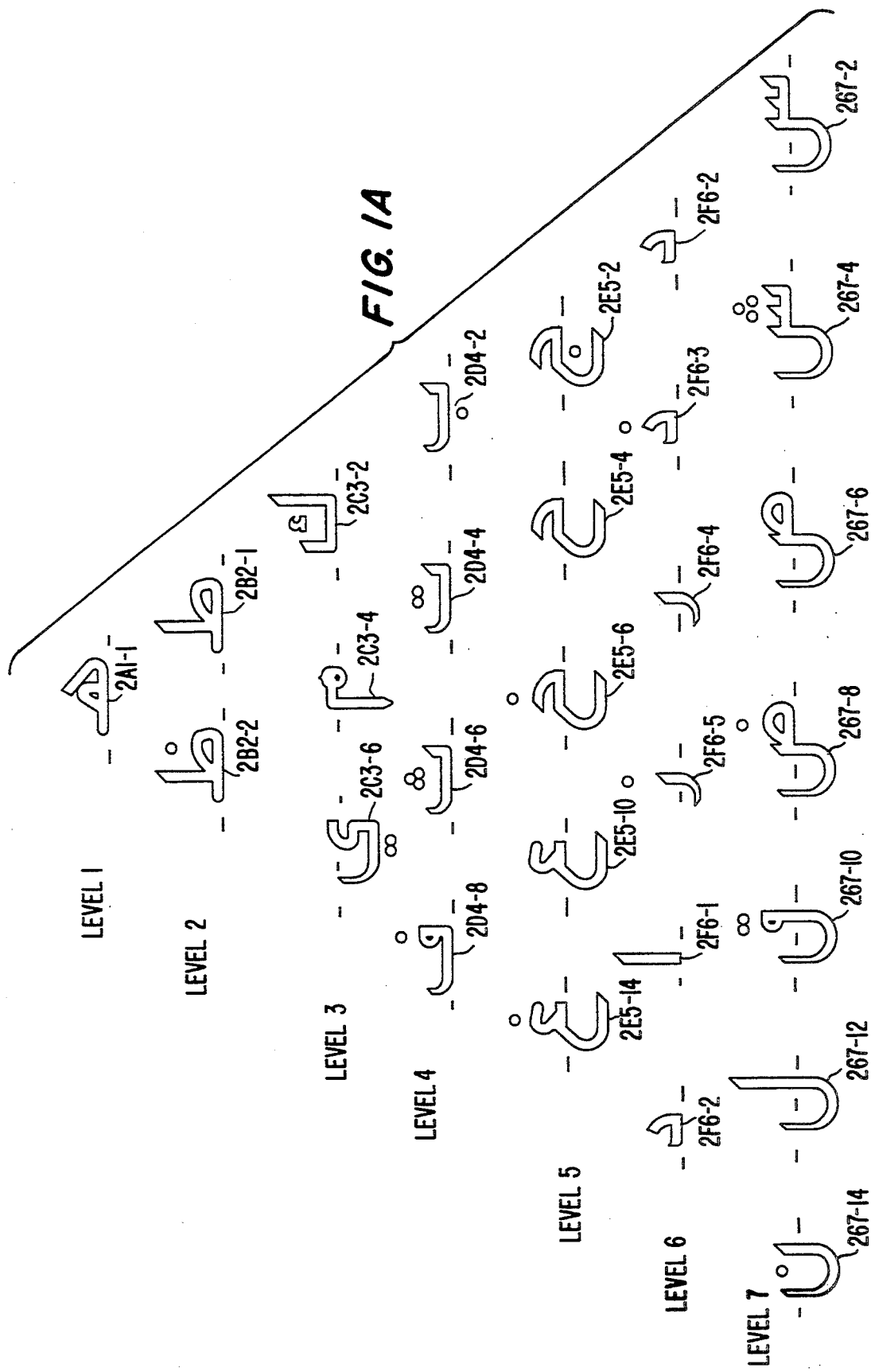

FIG. 1B

LEVEL 0

ع
3AX0-1

LEVEL 1

3X1-1  3X1-2  4A2  3X1-3

LEVEL 2

ط

LEVEL 3

4D3-2  4D3-4  4D3-3  4D3-1  3X3-1

LEVEL 4

4E4-2  4E4-3  4D3-1

LEVEL 5

4F5-5

LEVEL 6

2F6-6  5A6-1

LEVEL 7

| | 6 | 5 | 4 | 3 | 2 | 1 | |
|---|---|---|---|---|---|---|---|
| 'alif' | ا | ا | ا | ا | ا | ا | 1 |
| 'ba' | با | ب | ب | ب | ب | ب | 2 |
| 'ta' | تا | ت | ت | ت | ت | ت | 3 |
| 'tha' | ثا | ث | ث | ث | ث | ث | 4 |
| 'jim' | جا | ج | ج | ج | ج | ج | 5 |
| 'ha' | حا | ح | ح | ح | ح | ح | 6 |
| 'kha' | خا | خ | خ | خ | خ | خ | 7 |
| 'dal' | دا | د | د | د | د | د | 8 |
| 'dhal' | ذا | ذ | ذ | ذ | ذ | ذ | 9 |
| 'ra' | را | ر | ر | ر | ر | ر | 10 |
| 'zain' | زا | ز | ز | ز | ز | ز | 11 |
| 'sin' | سا | س | س | س | س | س | 12 |
| 'shin' | شا | ش | ش | ش | ش | ش | 13 |
| 'sad' | صا | ص | ص | ص | ص | ص | 14 |
| 'dad' | ضا | ض | ض | ض | ض | ض | 15 |
| 'ta' | طا | ط | ط | ط | ط | ط | 16 |
| 'za' | ظا | ظ | ظ | ظ | ظ | ظ | 17 |
| 'ain' | عا | ع | ع | ع | ع | ع | 18 |
| 'ghain' | غا | غ | غ | غ | غ | غ | 19 |
| 'fa' | فا | ف | ف | ف | ف | ف | 20 |
| 'qaf' | قا | ق | ق | ق | ق | ق | 21 |
| 'kaf' | كا | ك | ك | ك | ك | ك | 22 |
| 'lam' | لا | ل | ل | ل | ل | ل | 23 |
| 'min' | ما | م | م | م | م | م | 24 |
| 'nun' | نا | ن | ن | ن | ن | ن | 25 |
| 'ha' | ها | . | ه | ه | ه | ه | 26 |
| 'waw' | وا | و | و | و | و | و | 27 |
| 'ya' | يا | ي | ي | ي | ي | ي | 28 |

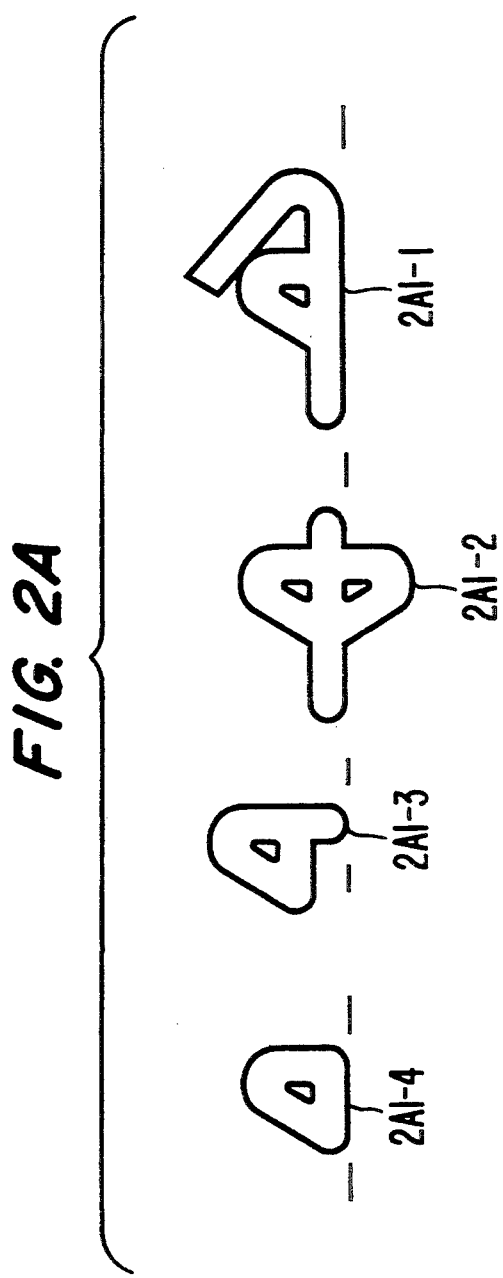

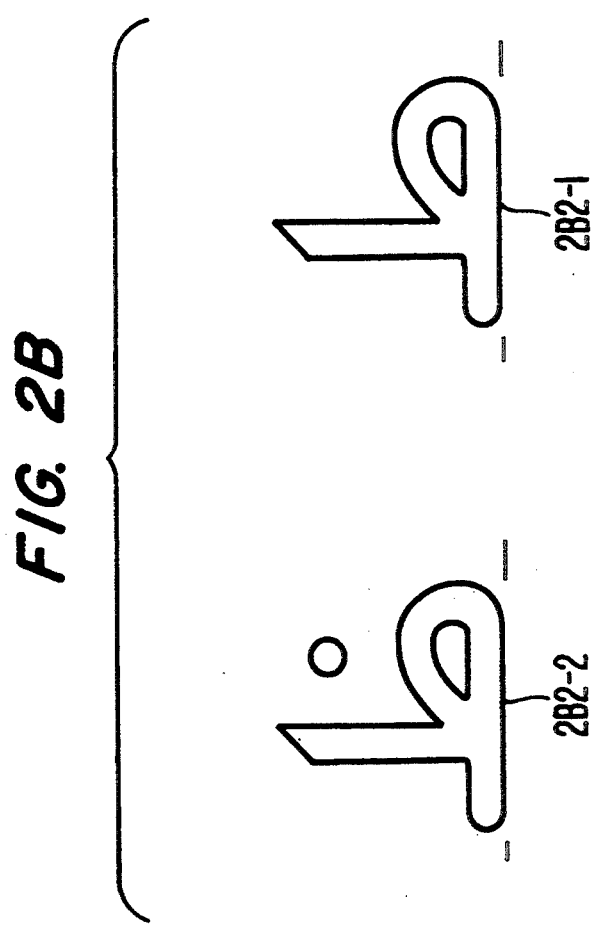

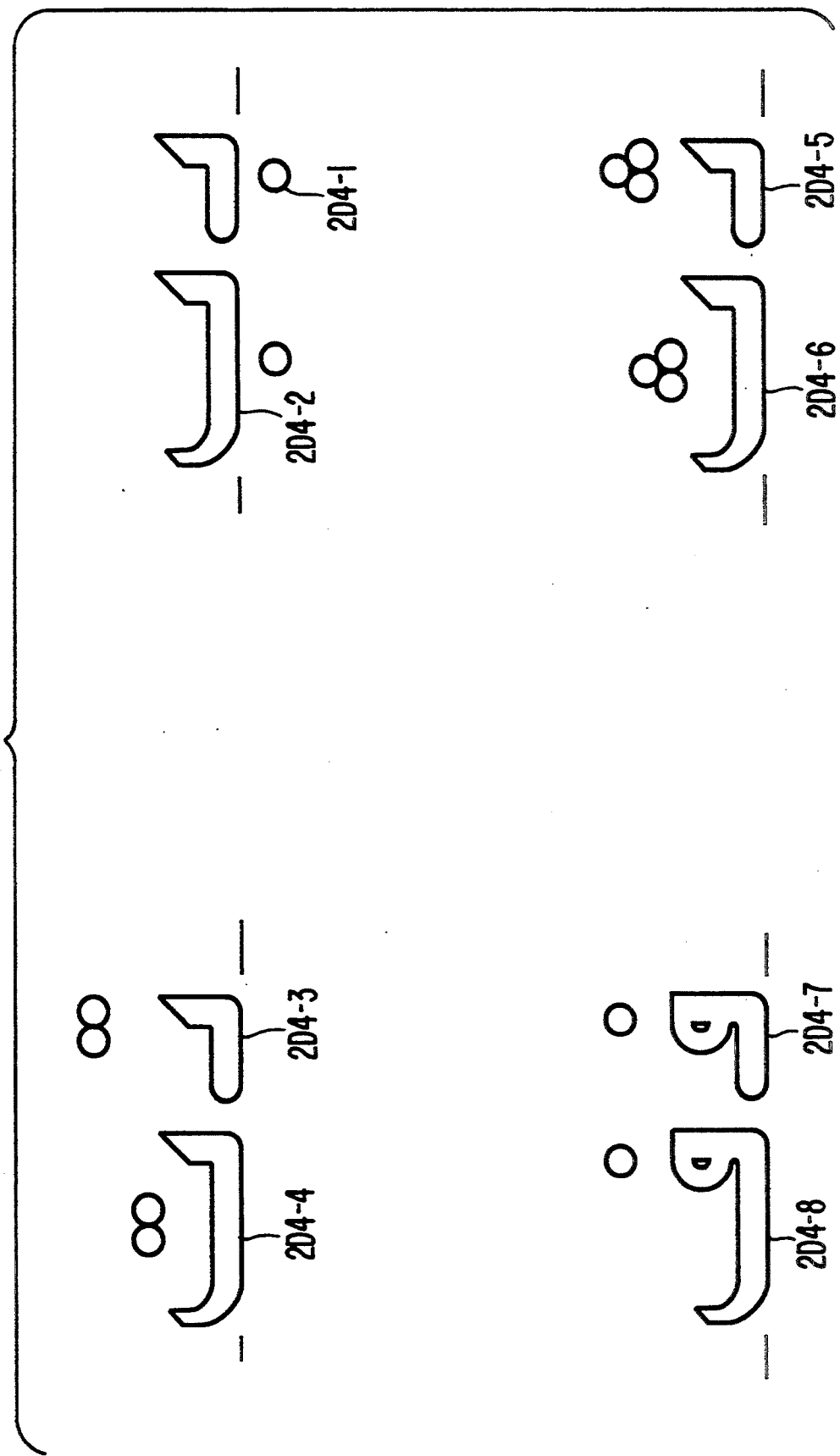

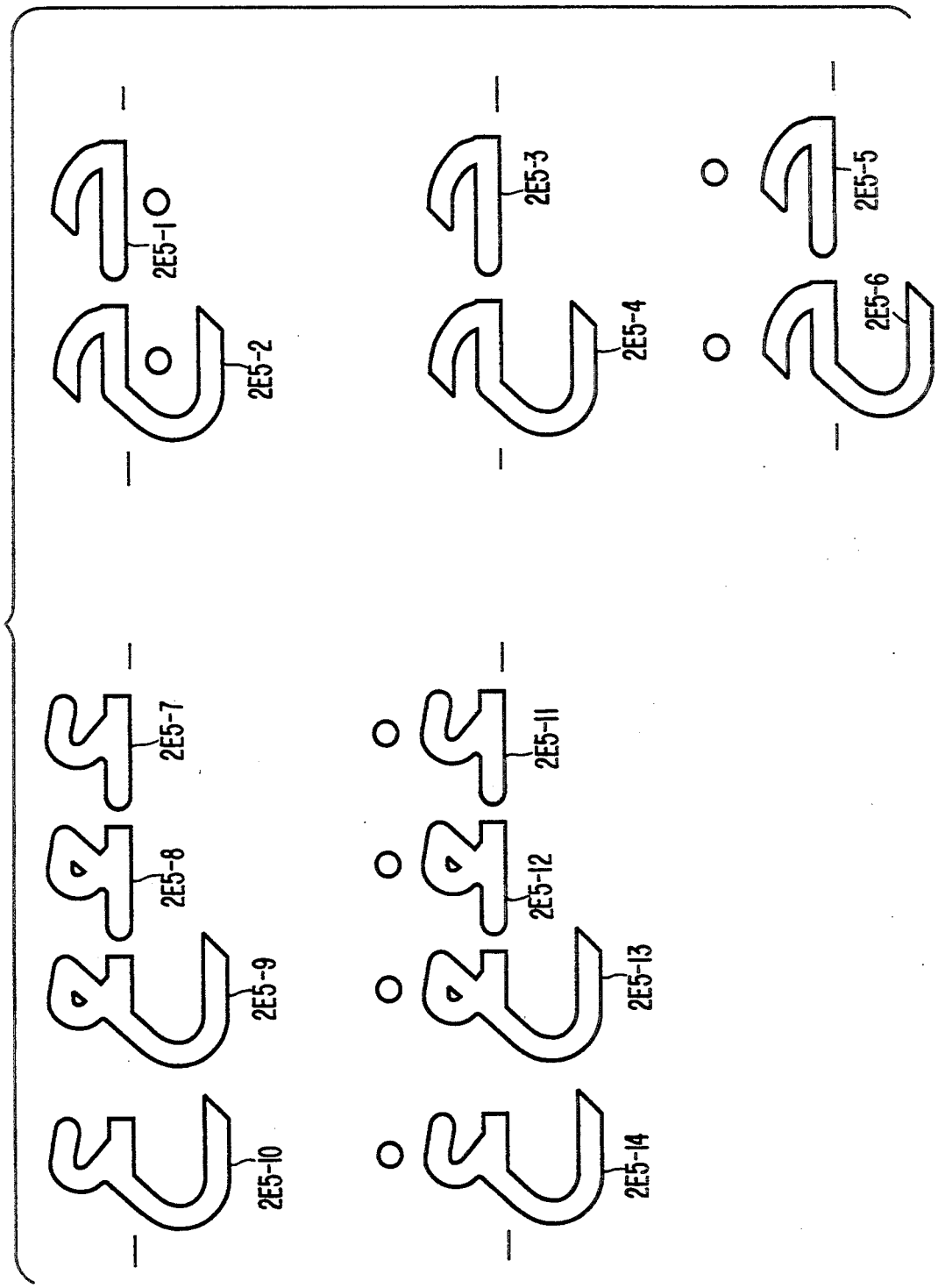

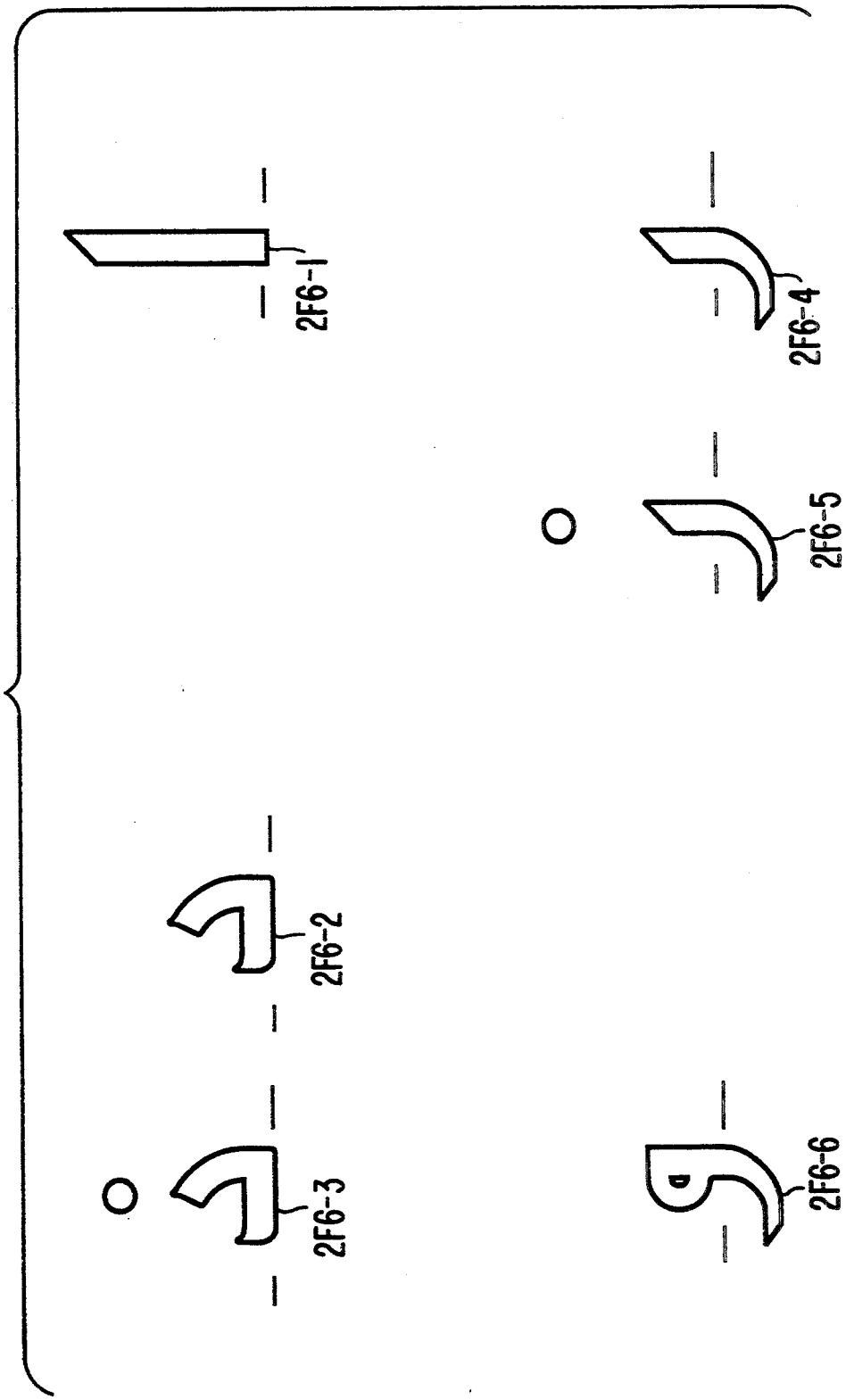

3AX0-1

3BX1-2    3BX1-1

3CX3-1

3DX7-1

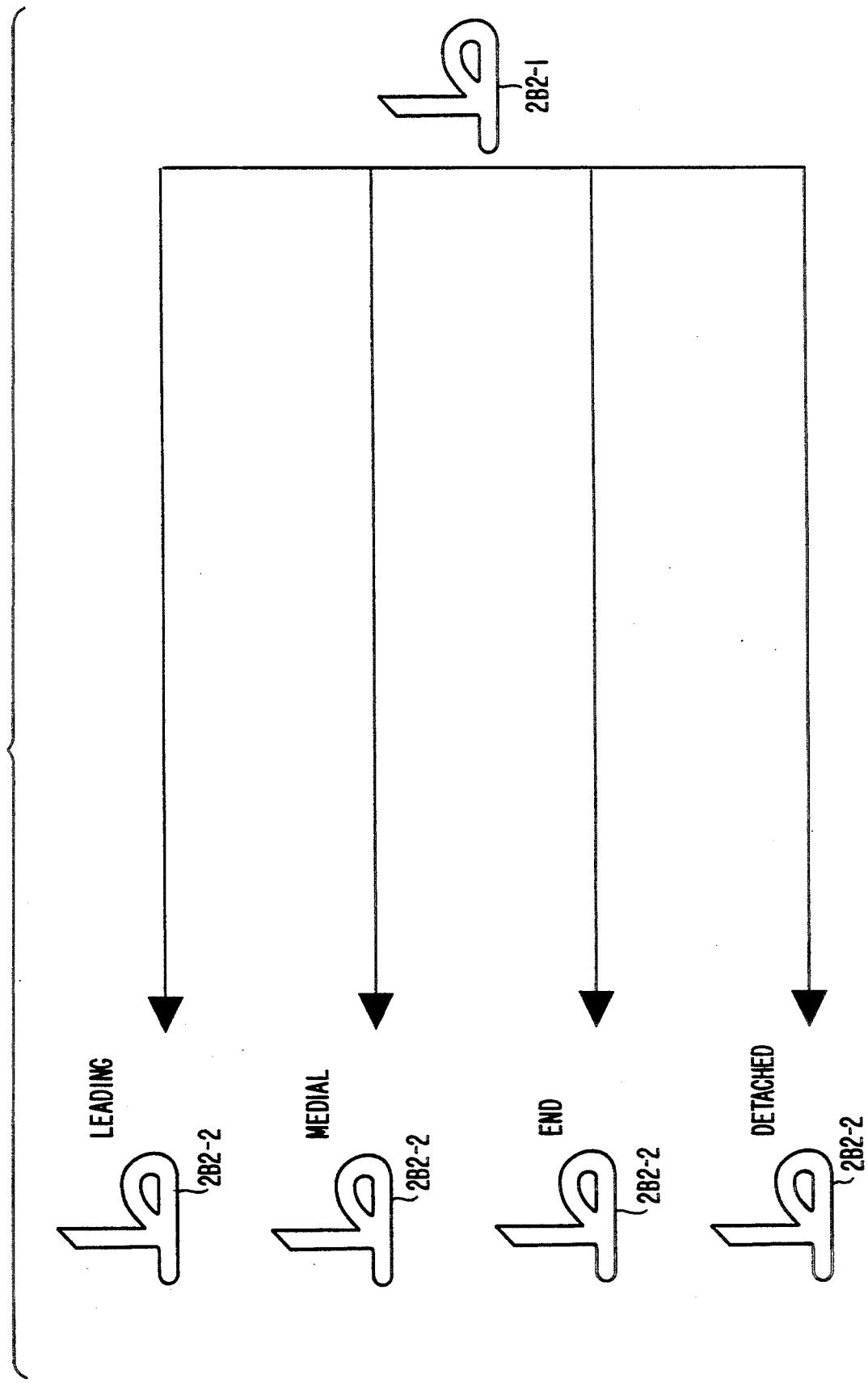

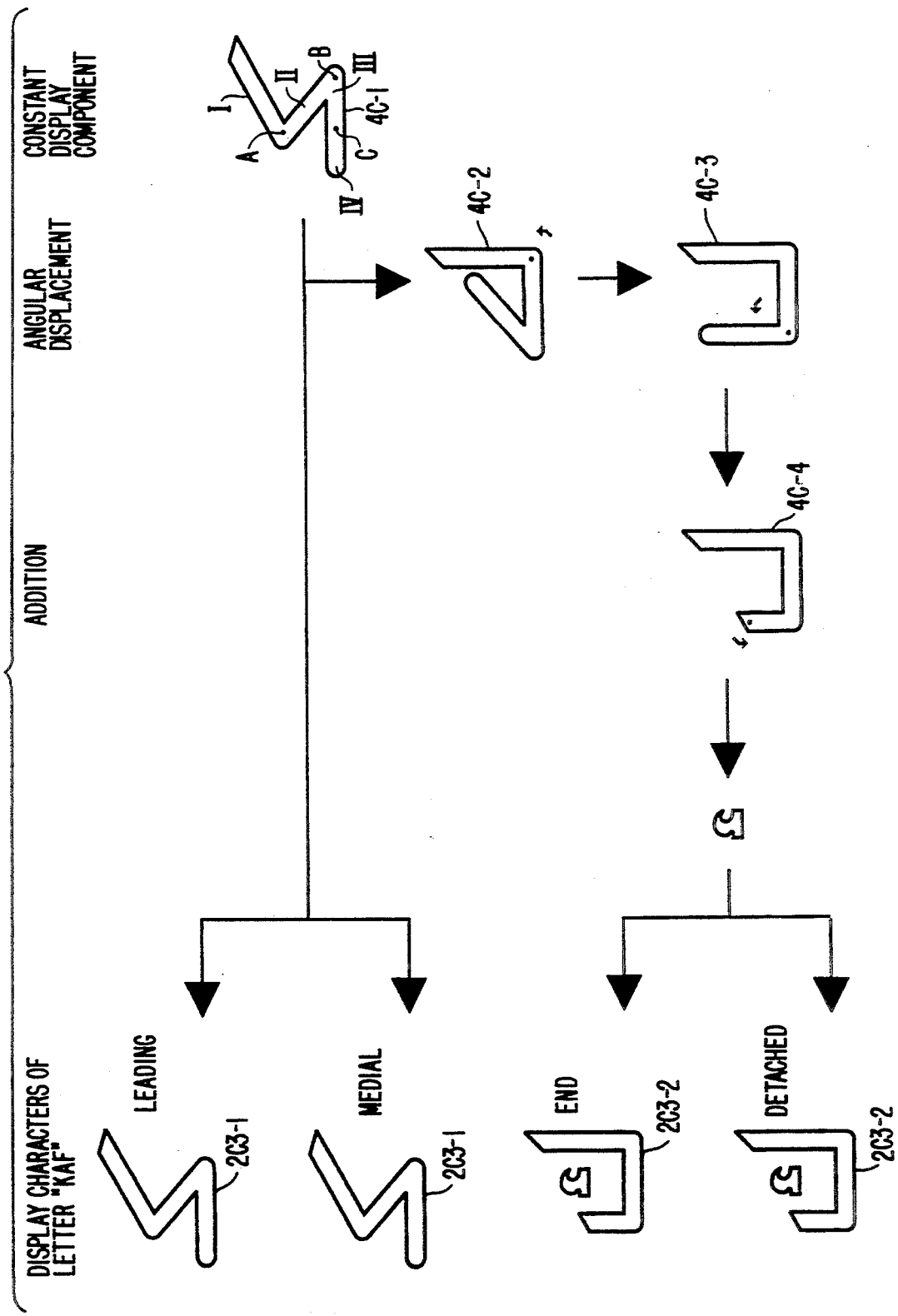

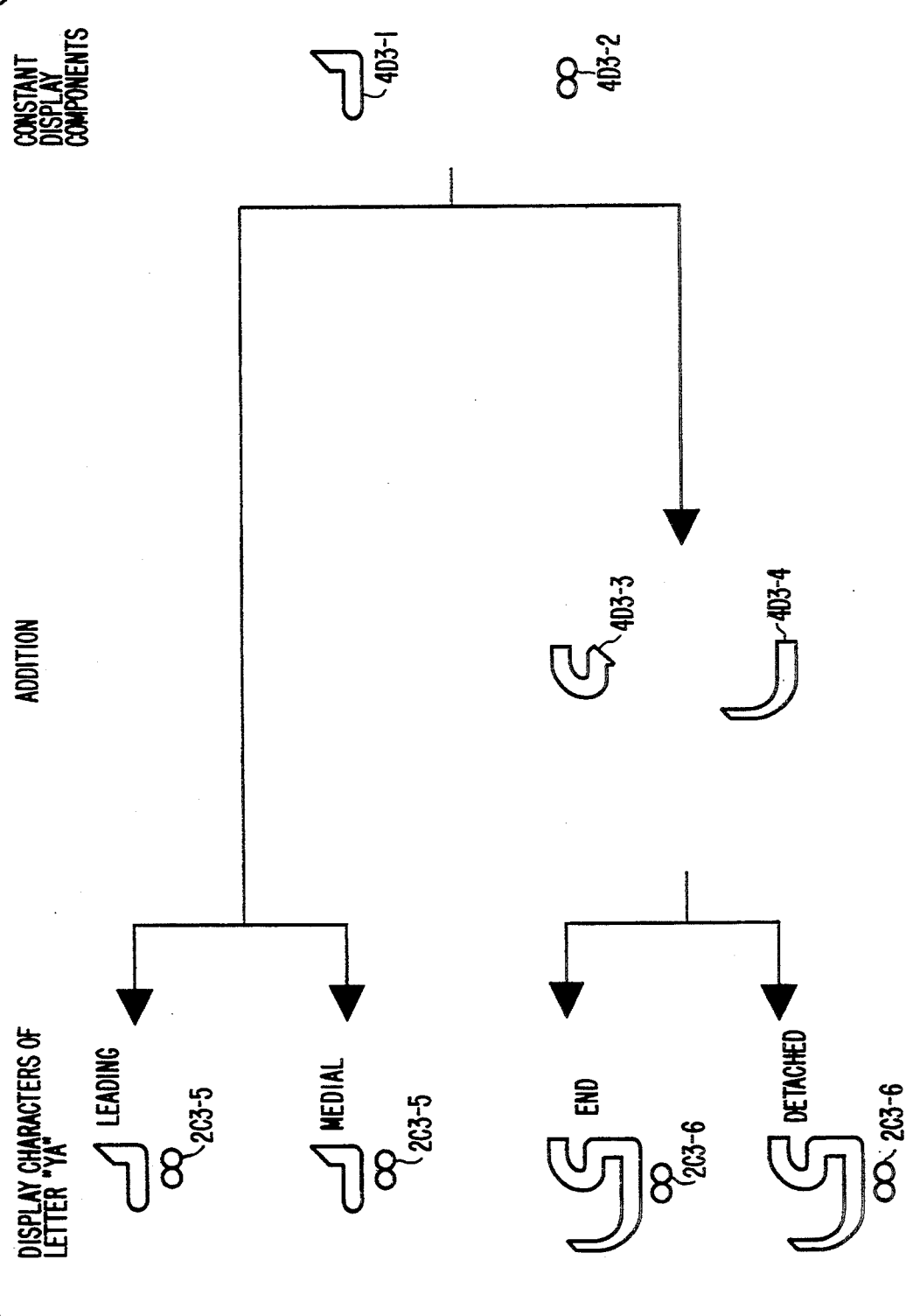

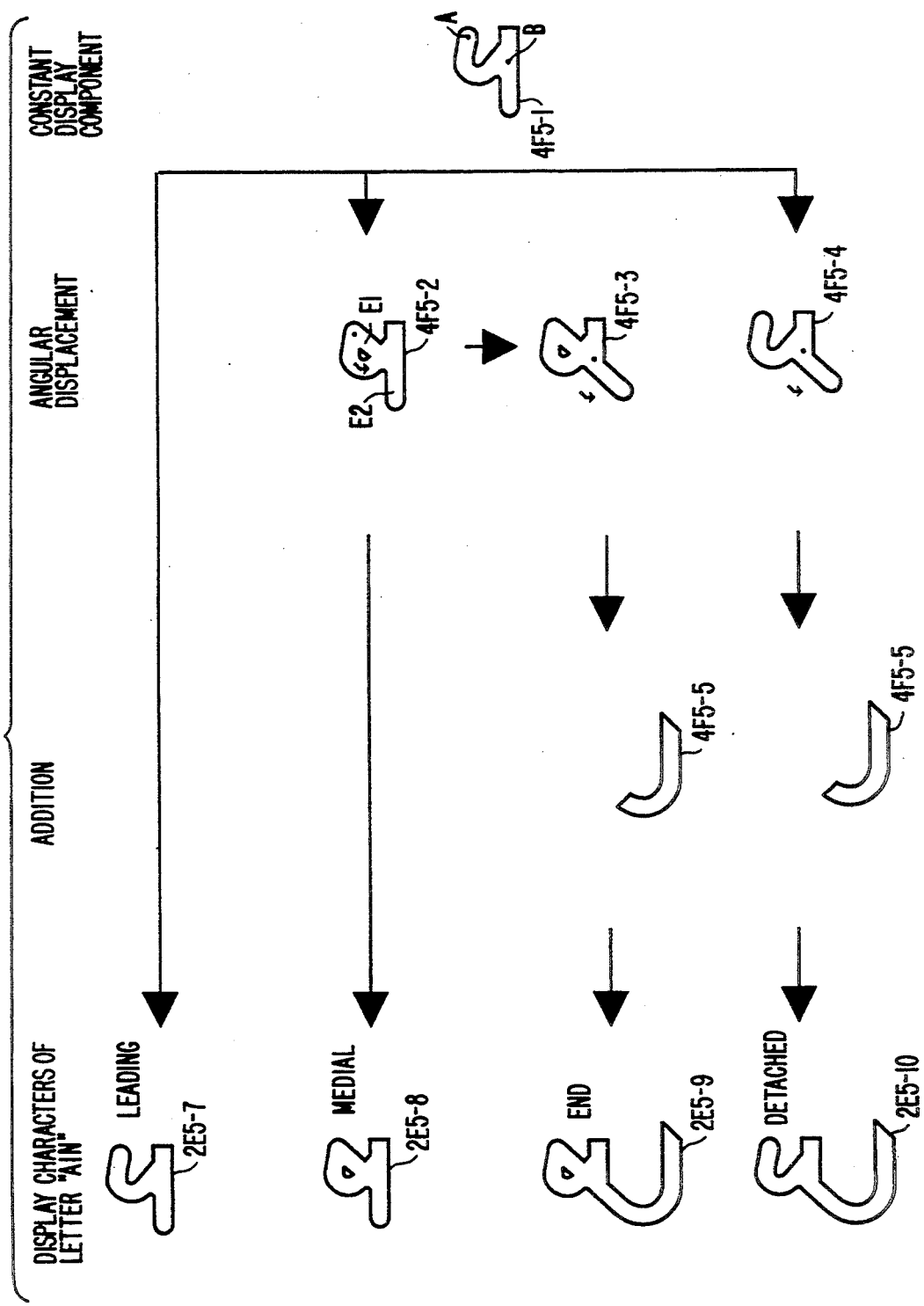

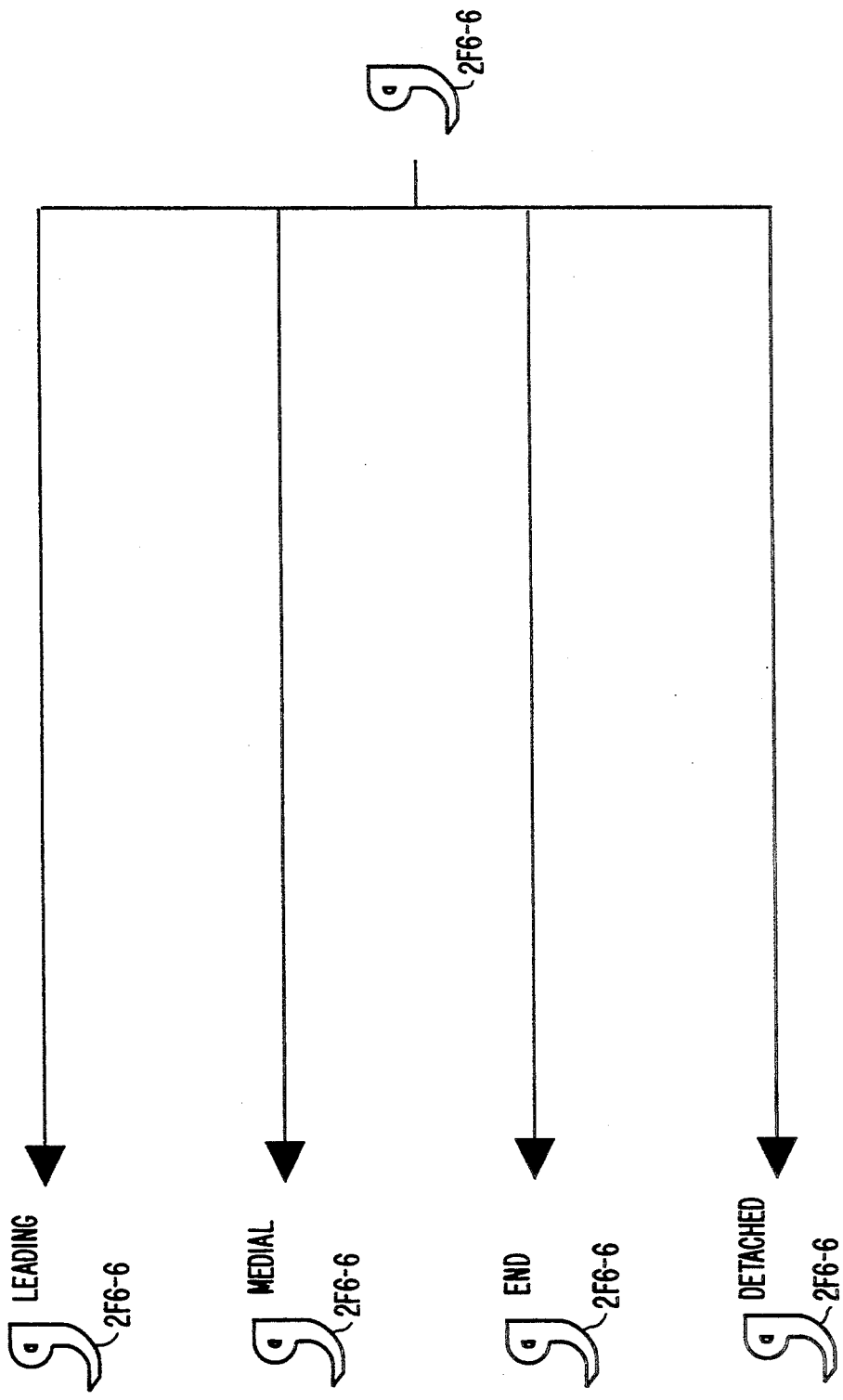

CONSTANT DISPLAY COMPONENTS

4H7-1

4A-1

ANGULAR DISPLACEMENT

5BI-1  T2

DISPLAY CHARACTERS OF LETTER "TA MARBUTAH"

END
5BI-2

DETACHED
5BI-3

FIG. 5C
CONSTANT DISPLAY COMPONENTS
 4D3-1
 4D3-3
 4D3-4
DISPLAY CHARACTERS OF LETTER "ALIF MAKSURAM"
 END 5A4
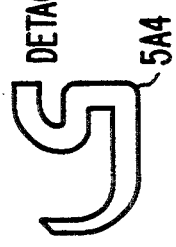 DETACHED 5A4

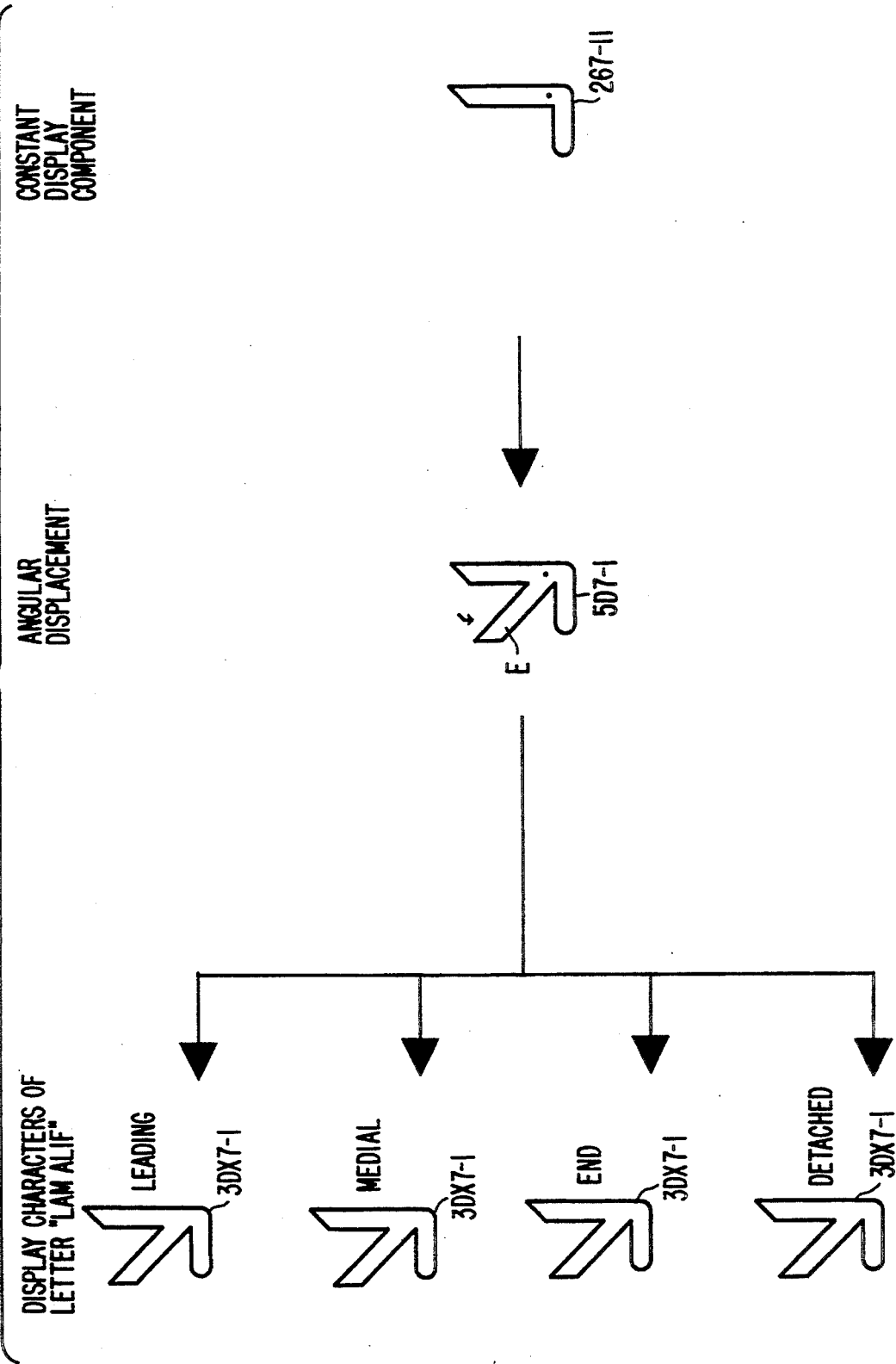

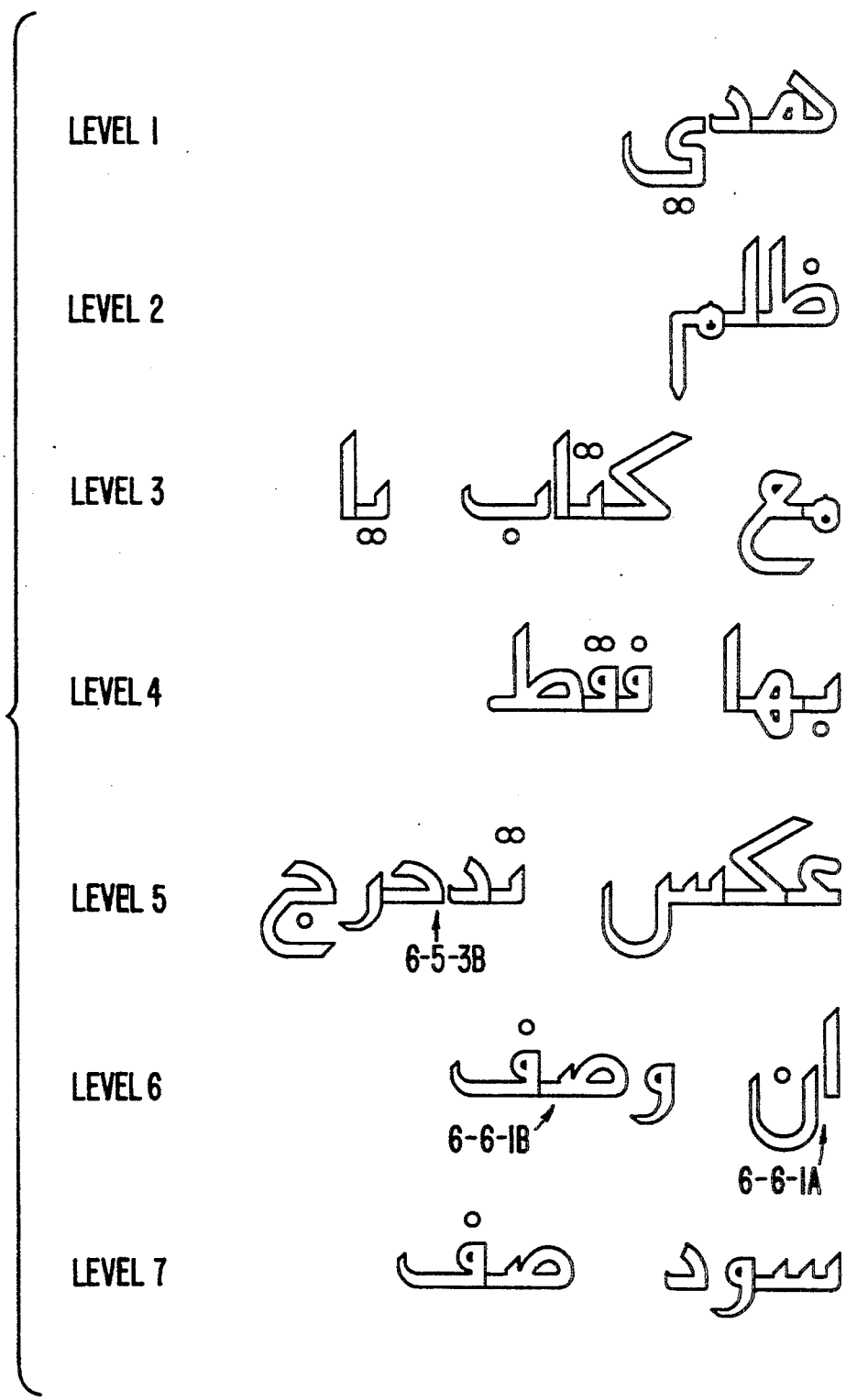

FIG. 7
LEVEL 1 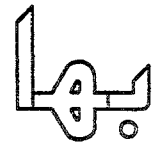
LEVEL 2 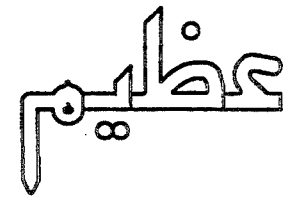
LEVEL 3 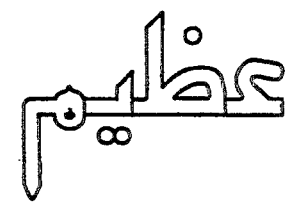
LEVEL 4 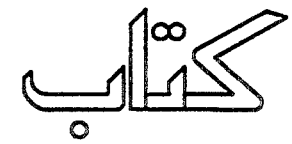
LEVEL 5 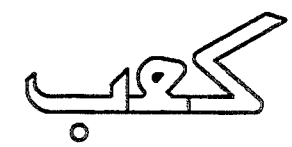
LEVEL 6 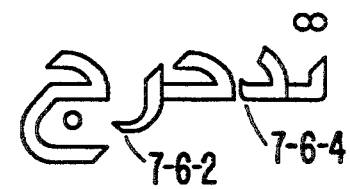
7-6-2   7-6-4
LEVEL 7  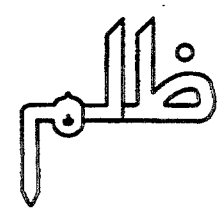

FIG. 9

LEVEL 1 — معناه

LEVEL 2 — غوط

LEVEL 3 — هدي

LEVEL 4 — كتاب

LEVEL 5 — تدحرج

LEVEL 6 — سود

LEVEL 7 — ان

LETTER DISPLAY

This is a continuation application of Ser. No. 07/639,062, filed Jan. 9, 1991, now abandoned.

PREAMBLE

This invention relates to the display of letters of an alphabet. It is specifically concerned with the display of letters of the Arabic alphabet but adaptable to the display of related alphabets such as Persian. In what follows use will be made of certain terms which are defined hereafter.

DEFINITIONS

'letter'

One of a set of discreet entities used in representing a language.

'alphabet'

A set of letters used to describe a particular language. This set is normally arranged in a conventional order.

'28 letter Arabic alphabet'

The Arabic alphabet is conventionally regarded as comprising 28 letters.

'character'

A conventional visual mark with a distinctive feature or distinctive features used to represent a letter.

'display character'

A character represented in a specific three-dimensional form incorporating one or more components.

'28 letter display character set'

The collection of display characters representing all character forms of the twenty-eight letters of the Arabic alphabet.

'display adjunct'

A three dimensional component which is not a character.

'display fount'

A set of single component display characters and display adjuncts each of which is distinct from any other member of the set and from which any display character can be derived.

'display component'

Any member of the display fount.

'constant display component'

A member of the display fount which is used in generating every instance of the display characters which represent a given letter.

'element'

A movable and integral component of a constant display component.

'total alphabet'

It is arguable that the Arabic alphabet is comprised of more than twenty-eight letters. If 'hamza', 'lam-alif', 'alif-maksurah' and 'ta-marbutah' are included as true letters it can be argued that the alphabet contains in excess of 30 letters. These extra letters are not conventionally taught to beginners. For the avoidance of confusion when these letters are included with the 28 letter alphabet the total set is referred to as the "total alphabet".

'total display character set'

The collection of display characters representing all character forms of the total alphabet.

'single-character alphabet'

The Arabic alphabet is conventionally introduced to a beginner by way of a single character representing each letter. Collectively these characters make up a single-character alphabet.

'single character display fount'

An expanded display fount incorporating certain display fount components such that all the components are required to generate all the display characters of the single character alphabet simultaneously.

ARABIC ALPHABET

The Arabic alphabet is cursive. The majority of its characters are to be linked to others when forming words.

A given letter of the 28 letter Arabic alphabet can have a leading, medial, terminal or detached character form depending on where in a word the letter comes. In some cases a letter is represented by the same character in all four roles; in the majority of cases a letter can take one of two forms in undertaking its four roles; in a few cases it can take a distinctive form in each of its four roles.

A group of six letters of the 28 letter Arabic alphabet have character forms which do not link to a following character.

The extra letters contained in the total alphabet set do not all follow the rules of the 28 letter set. This is one reason why they are omitted from the conventional Arabic alphabet. The letter 'hamza' follows unique rules. 'Ta-marbutah' and 'alif-maksurah' follow the rules of the 28 letters in every respect other than they only have end and detached character forms. 'Lam-alif' follows similar rules to the six letter group of characters in not linking to a following character. These last three letters are closely associated with certain letters of the 28 letter alphabet.

According to a first aspect of the present invention there is a provided a method of representing characters, C in number, of an alphabet numbering L letters (where C>L) by way of display characters generated from display components in which M (where M<L) of the display characters are represented per se; and the remaining N character (where N=C−M) are unrepresented; the M display characters being a part of a display fount which is adapted for transformation to generate the N remaining display characters.

In a first preferred form of the present invention the method includes a step of linking a display character to a following display character by way of a linkage to which both the display character and the following display character contribute.

In a second preferred form of the present invention or the first preferred form thereof the transformation involves either:

1) the connection of two or more display components; or
2) the angular displacement of an element relative to the remainder of the component; or
3) both connection and angular displacement as aforesaid.

According to a second aspect of the present invention there is provided a display fount for representing characters, C in number, of an alphabet number L letters (where C>L) by way of display characters generated from display components in which M (where M<L) of the display characters exist per se; and the remaining N characters (where N=C−M) are unrepresented; the M display characters being a part of a display fount which is adapted for transformation to generate the N remaining display characters.

In a first preferred form of the second aspect of the present invention at least some of the display characters incorporate linking means whereby a display character can be linked to a preceding display character.

In a second preferred form of the second aspect of the present invention or the first preferred form thereof at least some of the display components are adapted for transformation by incorporating:
1) a coupling whereby a display component can be connected with another display component; or
2) an element which can be angularly displaced relative to the remainder of the constant display component of which the element forms a part; or
3) both a coupling and an element as aforesaid.

EXEMPLARY EMBODIMENTS

Exemplary embodiments of the invention will now be described with reference to the accompanying drawings.

FIG. 1A shows display characters incorporating the forms of the single character alphabet disposed in a pyramidal relationship incorporating all components of the single character display fount.

FIG. 1B shows the set of components of the display fount.

FIG. 1C shows a table of the twenty eight Arabic letters and the characters used to represent them in their leading, medial, end and detached forms. This table has been adapted from a table appearing in a typical Arabic alphabet writing book.

Figure 2C:
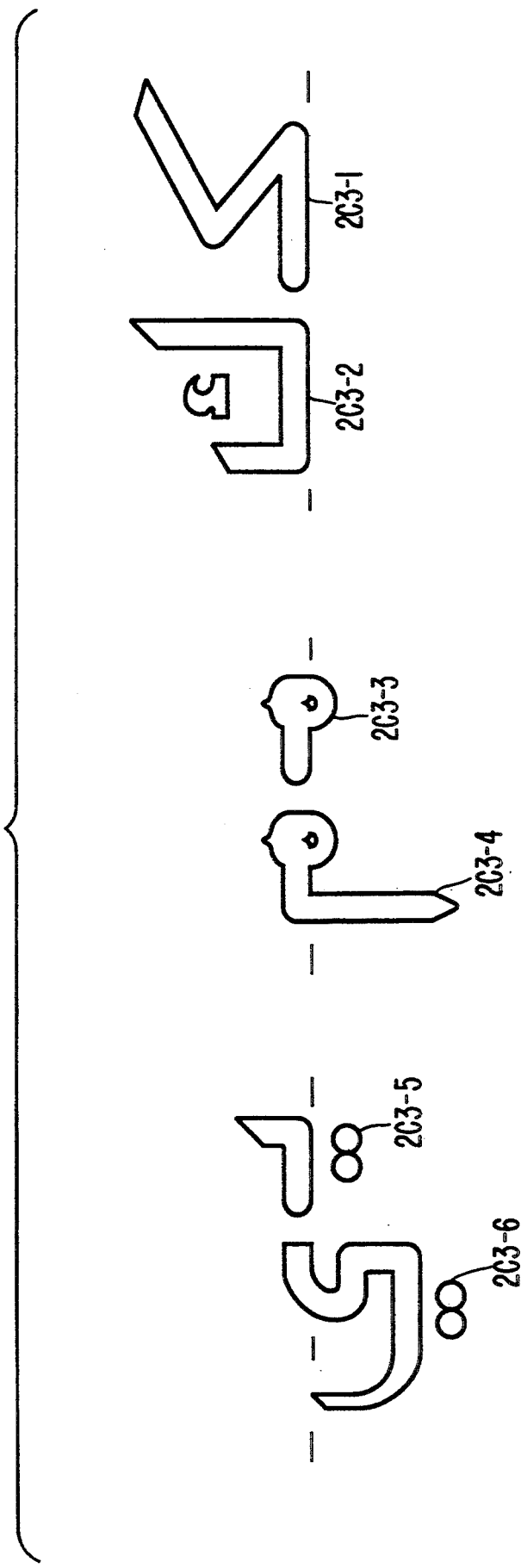

FIGS. 2A to 2G show the display characters of the letters of each level of the pyramid referred to in connection with FIG. 1A with the addition of all further character forms of the twenty-eight letters of the Arabic alphabet. These figures represent the 28 letter display character set. It should be noted that the suffix number of the 2A, 2B, 2C, etc. series refers to the level number in FIG. 1A.

FIGS. 3A to 3D show extra display characters which fall outside the twenty-eight letter Arabic alphabet. These figures relate to the extra display characters of the total alphabet. Any figure reference including an X relates to these extra display characters. It should be noted that the suffix number, except 0, in the 3-series indicates a close association with a letter represented in the same level number in FIG. 1A.

FIGS. 4A to 4H show the method by which the display characters described in connection with FIGS. 1A, and 2A to 2G where necessary are transformed using display components from the display fount (they do not show an exhaustive list of all possible transformations).

FIGS. 5A to 5D show the method by which extra display characters which fall outside the twenty-eight letter Arabic alphabet are transformed using display components from the display fount. These figures relate to the extra display characters of the alphabet set. Any figure reference including an X relates to these extra display characters.

FIGS. 6, 7, 8 and 9 show a limited range of examples of the use of display characters of the twenty-eight letter Arabic alphabet (variously described in connection with earlier figures) highlighting examples of leading, medial, end and detached character forms.

FIGS. 10, 11, 12 and 13 show a limited range of examples of the use of the extra display characters of the total alphabet in words demonstrating the usage of different forms of these extra display characters.

In the figures, the short horizontal lines on each side of the characters represent the line on which the character is positioned.

DISPLAY CHARACTER PYRAMID—FIG. 1A

This shows display characters of the single character Arabic alphabet disposed in the form of a pyramid with Levels 1 to 7. When embodied in this way the characters on a given level are distinctly colored as against the remaining levels so that when the characters are used to form words and sentences the level of origin of a particular character can be readily identified. This color coding also serves as a means of associating colored adjuncts to similarly colored constant display components of a specific level. Where a level contains more than one item they are listed in order from right to left. In each case dashes on either side of a display character show its position relative to a line datum.

The letters represented in each level are:
Level 1 the letter 'ha';
Level 2 the letters 'ta' and 'za';
Level 3 the letters 'kaf', 'mim' and 'ya';
Level 4 the letters 'ba', 'ta', 'tha', and 'fa';
Level 5 the letters 'jim', 'ha', 'kha', 'ain', and 'ghain';
Level 6 the letters 'alif', 'dal', 'dhal', 'ra', 'zain' and 'waw';
Level 7 the letters 'sin', 'shin', 'sad', 'dad', 'qaf', 'lam' and 'nun'.

Level 1 contains a single letter and each level contains the same number of letters as the number of the level.

Each display character represented is derived from a component of the display fount or a transformation requiring two or more components of the display fount.

Transformation of these display characters is undertaken in one or other or both of two basic ways: firstly, by attachment to/combination with, or detachment from, a display character of one or more display adjuncts, and the possible detachment/recombination of a constant display component; secondly by angular displacement of one or more elements pivotably attached to the constant display component.

DISPLAY FOUNT—FIG. 1B

This shows the actual display fount. The circles represent either circles or stars in the actual display components. In levels 4 and 5 where two circles appear these represent a circle and a star.

The color of all display components in a given level is the same. The display components of each level are given a color distinct to that of the color given to display components of any other level. The colors of display components in levels 1–7 correspond to the colors of display characters represented in levels 1–7 of FIG. 1A and to the colors of display characters in FIGS. 2A–2G (i.e. color of display components in level 3 of FIG. 1B is the same as display characters represented in level 3 of FIG. 1A which is the same as display characters represented in FIG. 2C). Display component 2B7-4 furthermore contains an element of similar color to display components in level 7.

Each display character of the total display character set can be derived from the display fount. Furthermore, each of the display characters corresponding to a given level can be derived from the components of the display fount corresponding to the same level.

Each of the display characters of the twenty-eight letter display character set can be generated from the display components of the display fount with the exclusion of display components 3AX0-1 and 3X1-1.

The single character display fount is comprised of all display component forms represented in FIG. 1B with the exclusion of display components 3AX0-1, 3X1-1 and 3X1-2.

ARABIC LETTER TABLE—FIG. 1C

FIG. 1C shows a table of the twenty-eight Arabic letters and the characters used in leading, medial, end and detached forms:

Column 1 shows the members of a single character alphabet set;

Column 2 shows characters used in their leading form;

Column 3 shows characters used in their medial form;

Column 4 shows characters used in their end form;

Column 5 shows characters used in their detached form; and

Column 6 shows the English transliteration used in this document for the Arabic letters.

Column 1 from top to bottom represents the traditional order of the twenty-eight letter Arabic alphabet.

In columns 3 and 4 dotted lines on a character indicate the position at which the character is joined to a previous character.

All character forms of letters corresponding to rows 1, 8, 9, 10, 11, 16, 17 and 27 are similar; characters corresponding to rows 2, 3, 4, 5, 6, 7, 12, 13, 14, 15, 20, 21, 22, 23, 24, 25 and 28 are of two similar forms; and characters corresponding to rows 18, 19 and 26 are of four different forms. Slight variations may be noticed between similar forms. These differences may be disregarded for teaching purposes.

It should be noted that columns 2–5 contain the 28 letter character set.

28 LETTER DISPLAY CHARACTER SET—FIGS. 2A to 2G

FIGS. 2A to 2G represent the 28 letter display character set and show the complete set of display characters corresponding to the letter represented in each level generally referred to in connection with FIG. 1A.

In this case circles are used to represent the location in the actual display characters of stars, used in cases above the datum line, and circles, used in cases below the line. The characters shown in FIGS. 2A to 2G are based on a modular concept to provide for a family resemblance between the letters in the complete alphabet set.

The display characters have a distinct family resemblance as a result of being, for the most part, of a common width and height, where the width is given by a perpendicular line extending between the two longest sides of the display character of 'alif' (2F6-1), and where the height is given by the longest side of the same letter.

All the ascender and descenders (with the exception of 2C) of these display characters are of the same length. The ratio of length of the ascender/descender to the width of the letter is in conformity with accepted rules of Arabic calligraphy; that all the stars share one of two common distances above the datum line, and (with the exception of 2C3-6) all circles are a common distance below the datum line.

Level 1 (FIG. 2A)

The letter 'ha' (letter 26 in FIG. 1C) is here shown at 2A1-1 in the form shown in FIG. 1A level 1 which is the form it takes when leading a word (that is to say at the right hand end—column 2). Form 2A1-2 shows the form taken when in a medial position—column 3. Form 2A1-3 when located in the end position—column 4. Form 2A1-4 is used when detached—column 5. In this particular case the four display character forms all differ from one another.

This is the only letter represented by a leading character form in the single character alphabet, whereas all other letters are represented by the detached form. Compare columns 1 and 5 of FIG. 1C.

Level 2 (FIG. 2B)

The letters 'ta' (2B2-1 cf Letter 16) and 'za' (2B2-2 cf letter 17) are constant in form regardless of their location (Columns 2, 3, 4, and 5).

Level 3 (FIG. 2C)

| LETTER | FIG. 1C | LEADING AND MEDIAL FORM | END AND DETACHED FORM |
| --- | --- | --- | --- |
| 'kaf' | 22 | 2C3-1 | 2C3-2 |
| 'mim' | 24 | 2C3-3 | 2C3-4 |
| 'ya' | 28 | 2C3-5 | 2C3-6 |

Level 4 (FIG. 2D)

| LETTER | | LEADING AND MEDIAL | END AND DETACHED FORM |
| --- | --- | --- | --- |
| 'ba' | 2 | 2D4-1 | 2D4-2 |
| 'ta' | 3 | 2D4-3 | 2D4-4 |
| 'tha' | 4 | 2D4-5 | 2D4-6 |
| 'fa' | 20 | 2D4-7 | 2D4-8 |

Level 5 (FIG. 2E)

| LETTER | | LEADING AND MEDIAL FORM | END AND DETACHED FORM |
| --- | --- | --- | --- |
| 'jim' | 5 | 2E5-1 | 2E5-2 |
| 'ha' | 6 | 2E5-3 | 2E5-4 |
| 'kha' | 7 | 2E5-5 | 2E5-6 |

| | | LEADING | MEDIAL | END | DETACHED |
| --- | --- | --- | --- | --- | --- |
| 'ain' | 18 | 2E5-7 | 2E5-8 | 2E5-9 | 2E5-10 |
| 'ghain' | 19 | 2E5-11 | 2E5-12 | 2E5-13 | 2E5-14 |

Level 6 (FIG. 2F)

| LETTER | | LEADING, MEDIAL, END AND DETACHED FORM |
| --- | --- | --- |
| 'alif' | 1 | 2F6-1 |
| 'dal' | 8 | 2F6-2 |
| 'dhal' | 9 | 2F6-3 |
| 'ra' | 10 | 2F6-4 |
| 'zain' | 11 | 2F6-5 |
| 'waw' | 27 | 2F6-6 |

Level 7 (FIG. 2)

| LETTER | | LEADING AND MEDIAL FORM | END AND DETACHED FORM |
| --- | --- | --- | --- |
| 'sin' | 12 | 267-1 | 267-2 |
| 'shin' | 13 | 267-3 | 267-4 |
| 'sad' | 14 | 267-5 | 267-6 |
| 'dad' | 15 | 267-7 | 267-8 |

-continued

| LETTER | | LEADING AND MEDIAL FORM | END AND DETACHED FORM |
| --- | --- | --- | --- |
| 'qaf' | 21 | 267-9 | 267-10 |
| 'lam' | 23 | 267-11 | 267-12 |
| 'nun' | 25 | 267-13 | 267-14 |

EXTRA DISPLAY CHARACTERS—Figures in 3 series

Reference is now made to Figures in the 3 series made up of FIGS. 3A, 3B, 3C and 3D.

In this series of figures reference is made to a 'display character' in the sense that they represent letters of the total alphabet. It will be noticed that none of the equivalent character forms of the 3 series of figures appear in FIGS. 1A or 1C.

Figure 2G:
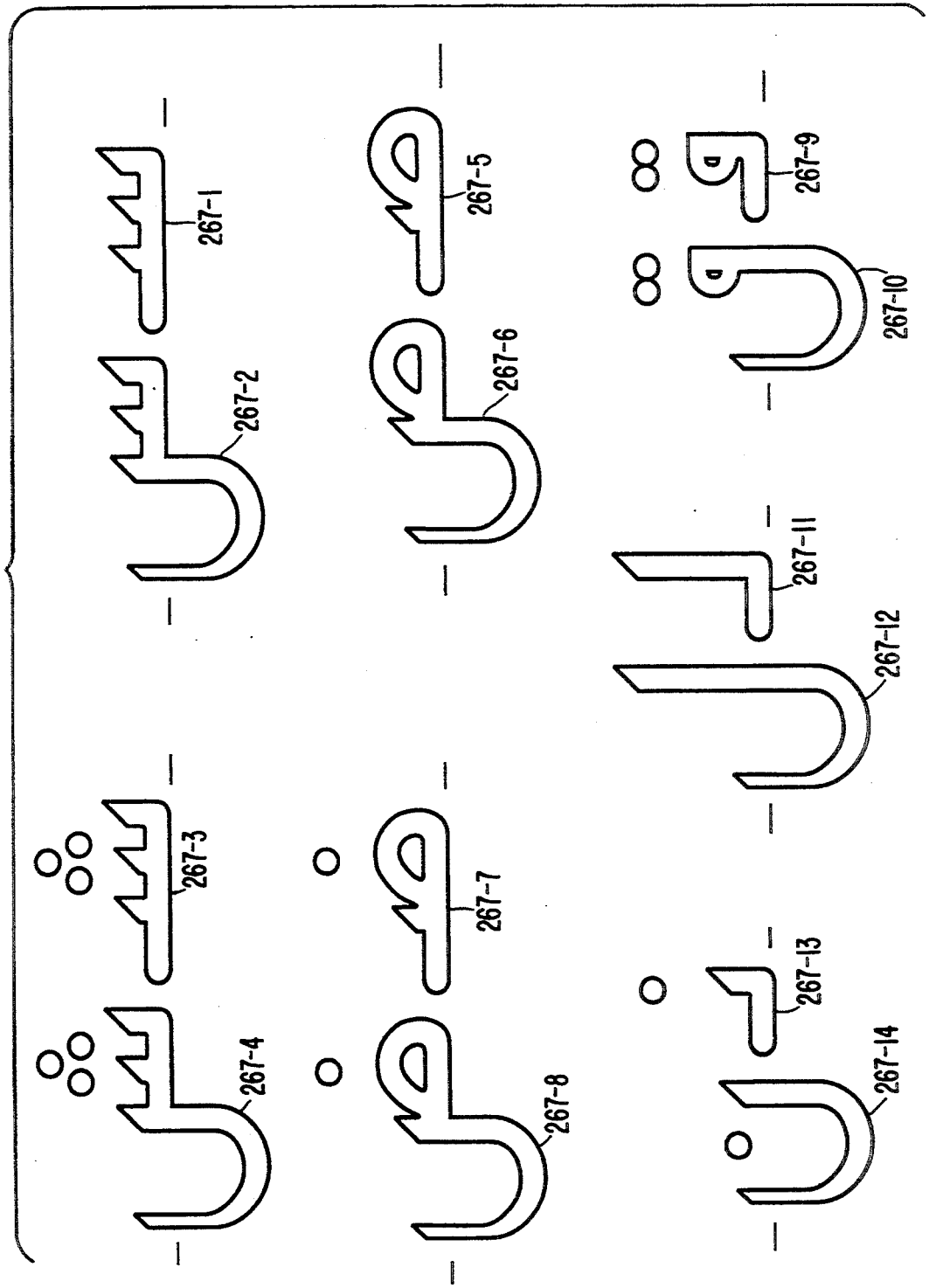
Figure 3A:

FIG. 3A shows a display character ('hamza') which is colored differently from characters in FIGS. 2A to 2G. Despite the apparent similarity of 'hamza' 3AX0-1 to a display adjunct (see 3X3-1 in FIG. 1B) incorporated in level 3, it is not related.

Figure 3B:
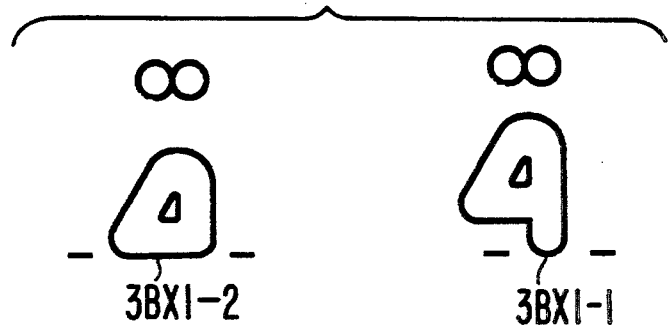
Figure 3C:
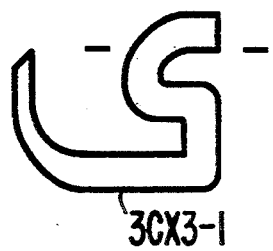
Figure 3D:
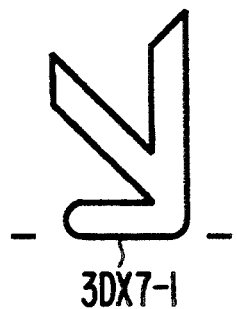

FIGS. 3B, 3C and 3D are numbered to correspond with the levels of the pyramid of FIG. 1B.

FIG. 3A

| LETTER | SOLITARY FORM |
| --- | --- |
| 'hamza' | 3AX0-1 |

(In this case 'hamza' has been referred to in its 'Solitary' and not 'Detached' form. 'hamza' operates in a different way to all other characters of the alphabet and attention is drawn to Figure CX0 below.

FIG. 3B

| LETTER | END AND DETACHED FORM |
| --- | --- |
| 'ta-marbutah' | 3BX1-1 and 3BX1-2 |

(It should be noted that this letter has only end and detached character forms.)

FIG. 3C

| LETTER | END AND DETACHED FORM |
| --- | --- |
| 'alif-maksurah' | 3CX3-1 |

(It should be noted that this letter has only end and detached character forms.)

FIG. 3D

| LETTER | LEADING, MEDIAL, END AND DETACHED FORM |
| --- | --- |
| 'lam-alif' | 3DX7-1 |

GENERATION OF THE 28 LETTER DISPLAY CHARACTERS—FIGS. 4A–4H

These figures show examples of how display characters shown in FIGS. 2A–2G are generated from the display fount: one letter being cited from each of FIGS. 2A to 2B and 2D to 2G, and two letters from FIG. 2C. FIGS. 2D, 2E and 2G should suffice as paradigms from which to generate the remaining character forms of the twenty-eight letter display character set.

It should be noted that components 3AX0-1 and 3X1-1 of FIG. 1B are not incorporated in any of the transformations required to generate the twenty-eight letter display character set.

The transformation of one display character into another display character in all cases involves the retention of at least one constant display component used in constructing the display characters in all its forms. For this reason the series of FIGS. 4A–4H shows the display characters derived from a constant display component or constant display components.

Each of FIGS. 4A to 4H have a common format. This is used whether or not changes in character form actually occur for a given letter.

On the right hand side is shown the constant display component/s which is/are common to all the display character forms of the letter involved.

On the left hand side are shown examples of, from the top of the figure, the leading, medial, end and detached forms of the letter involved.

In the event of differences between a form shown on the left hand side and the component/s on the right, the difference in form is achieved by transformation applied to the component/s shown on the right. The transformation is achieved either by angular displacement of one or more pivoted element/s and/or the addition/combination of a display adjunct or display adjuncts.

Any and all display adjuncts and any and all transformations are shown between the left and right hand items.

It should be noted that only certain constant display components are adapted with elements permitting angular displacement.

Figure 4A:
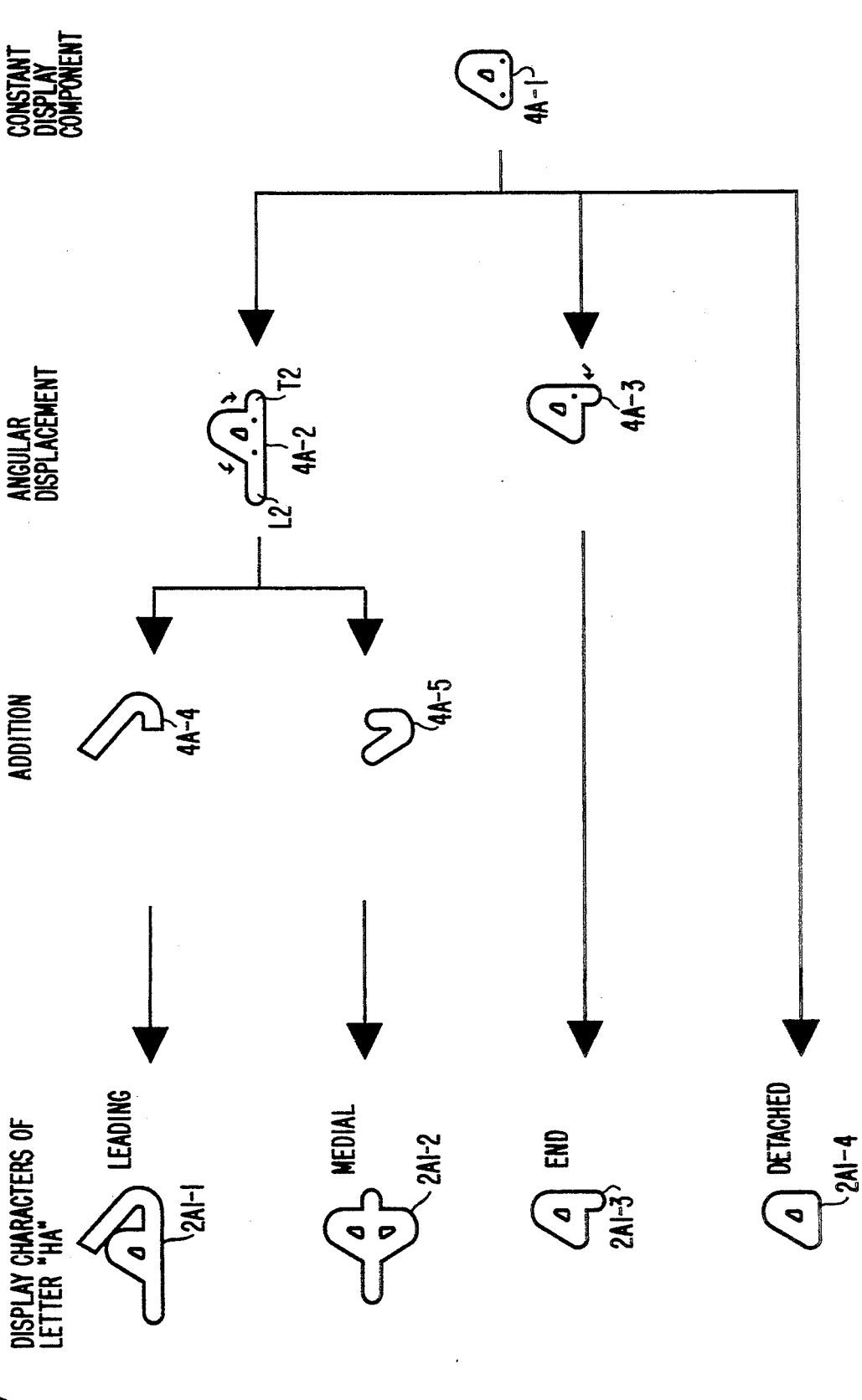

FIG. 4A (See also FIG. 1A (level 1), FIG. 1B (level 1), FIG. 1C (row 26) and FIG. 2A)

The forms in FIG. 4A have a constant display component which is shown as component 4A-1 in FIG. 4A. Where necessary the component 4A-1 is transformed by pivoted elements and by adjuncts, as will be described hereafter, into one of the finished versions of the letter 'ha'. These are made up of display character 2A1-1 (leading form), 2A1-2 (medial form), 2A1-3 (end form) and 2A1-4 (detached form).

Component 4A1 incorporates pivoted elements which can be pivoted about, respectively, pivots A and B. In component 4A-2 one pivoted element T2 provides a trailing link and a second pivoted element L2 provides a leading link.

When in the form 4A-1, and the identical detached form 2A1-4, the elements L2 and T2 are pivoted to lie aligned within the body of the remainder of the component. In form 4A-3 the element L2 is shown extending downwardly from pivot A.

The use of one or other of the two adjuncts 3X1-2, 3X1-3 in combination with 4A-2, in which elements L2 and T2 have been pivoted horizontally, enables the component 4A1 to be transformed into other forms. Thus the leading display character form 2A1-1 is obtained by overlapping the trailing link T2 with a recess in adjunct 3X1-3.

The medial display character form 2A1-2 is obtained by sliding recessed sections of the adjunct 3X1-2 beneath the appropriate region of form 4A-2.

FIG. 4B (See also FIG. 1A (level 2), 1B (level 2), 1C (row 16) and FIG. 2B)

There are no transformations involved for the display character forms shown in Level 2. Component 2B2-1 is unchanged in leading, medial, end and detached forms. It should be noted that these display character forms are adapted to link to a following display character as will be described hereafter.

FIG. 4C (See also FIG. 1A (level 3), FIG. 1B (level 3), 1C (row 22) and FIG. 2C (particularly forms 2C3-1 and 2C3-2).)

FIG. 4C shows a display component 4C-1 which incorporates pivots A, B, C allowing elements I, II, III and IV to be angled relative to one another. Component 4C-1 corresponds to, or can be transformed into, display character 2C3-1 (leading form), 2C3-1 (medial form), 2C3-2 (end form) and 2C3-2 (detached form). In this case component 4C1 and form 2C3-1 are identical. To generate end form 2C3-2 and detached form 2C3-2 the component 4C-1 is transformed by realigning the elements I-IV as shown by steps 4C-2 to 4C-4 and adding an adjunct 3X3-1 commonly known as 'hamza' but not to be confused with the real 'hamza' which is shown at 3AX0-1 in FIGS. 1B and 3A and hereafter with reference to FIGS. 5A and 10.

It should be noted that in form 4C-4 element IV has been rotated relative to element III through 180 degrees falling under element III.

FIG. 4D (See also FIG. 1A (level 3), FIG. 1B (level 3), FIG. 1C (row 28) and FIG. 2C (particularly forms 2C3-5 and 2C3-6))

FIG. 4D shows a pair of constant display components 4D3-1 and 4D3-2 and a pair of display adjuncts 4D3-3 and 4D3-4.

Components 4D3-1 and 4D3-2 correspond to, or can be transformed into, display character 2C3-5 (leading form), 2C3-5 (medial form), 2C3-6 (end form) and 2C3-6 (detached form). While component 4D3-1 and 4D3-2 appear in all display character forms, their relative alignment differs from one version common to leading and medial forms to the version common to the end and detached forms. To generate end form and detached form 2C3-6 the components 4D3-1 and 4D3-2 are combined and display adjuncts 4D3-3 and 4D3-4 are attached to the extremities of component 4D3-1.

Figure 4E:
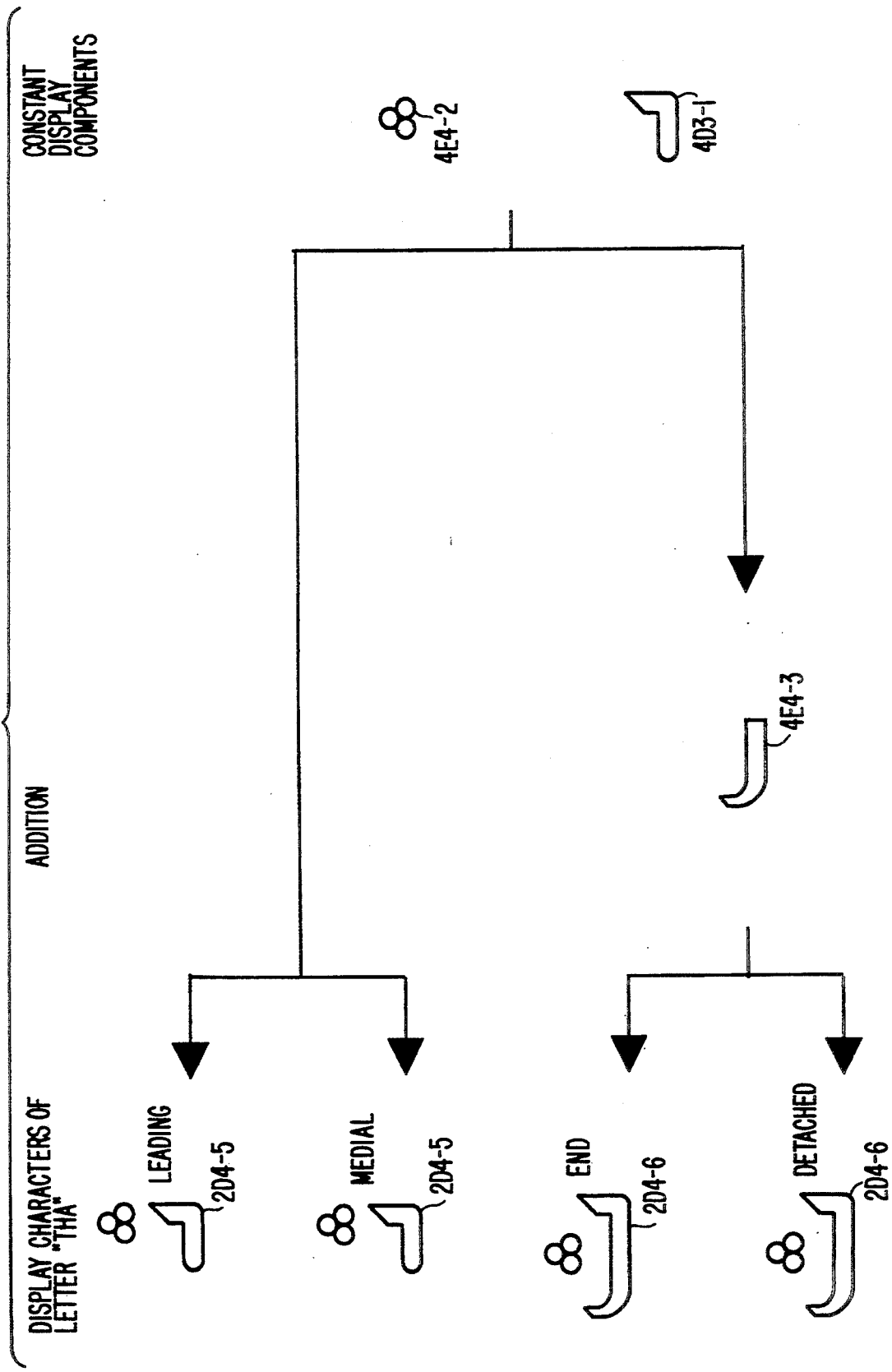

FIG. 4E (See also FIG. 1A (level 4), FIG. 1B (level 4), FIG. 1C (row 4) and FIG. 2D (in particular forms 2D4-5 and 2D4-6))

The Figure shows two constant display components 4D3-1 and 4E4-2 which, while they appear in all display character forms, their relative alignment differs from one version common to forms 2D4-5 to the version common to forms 2D4-6. A single display adjunct 4E4-3 is used in end and detached forms of the letter.

Leading form and medial form 2D4-5 are identical and are formed by the combinations of components 4D3-1 and 4E4-2.

End form and detached form 2D4-6 are identical and formed by the combination of adjunct 4E4-3 with components 4D3-1 and 4E4-2.

FIG. 4F (See also FIG. 1A (level 5), 1B (level 5), 1C (row 18) and FIG. 2E (particularly forms 2E5-7 to 2E5-10))

Component 4F5-1 incorporates two pivots A, B which provide for the pivotal attachment of, respectively, elements E1 and E2 to the component so as to enable them to be positioned as will be described hereafter.

Leading form 2E5-7 is identical with component 4F5-1. Medial form 2E5-8 is generated by angular displacement of element E1 pivotably attached to the component 4F5-1 by way of pivot A (see FIG. 4F5-2). Element E1 is otherwise aligned with the body of the component.

End form 2E5-9 and detached form 2E5-10 are derived from component 4F5-1 by angling element E2 downwardly from its former horizontal position, see 4F5-2 and 4F5-3, and placing over its lower end the upper end of a display adjunct 4F5-5. In the case of 2E5-9 element E1 is also displaced in the same way as described in 4F5-2.

FIG. 4G (See also FIG. 1A (level 6), 1B (level 6), 1C (row 27) and FIG. 2F (in particular form 2F6-6).)

As was the case with items on Level 2 there are no form variations and component 2F6-6 is unchanged in leading form, medial form, end form and detached form. It should be noted that these display character forms, unlike those in FIG. 4B, are not adapted to link to a following display character as will be described hereafter.

Figure 4H:
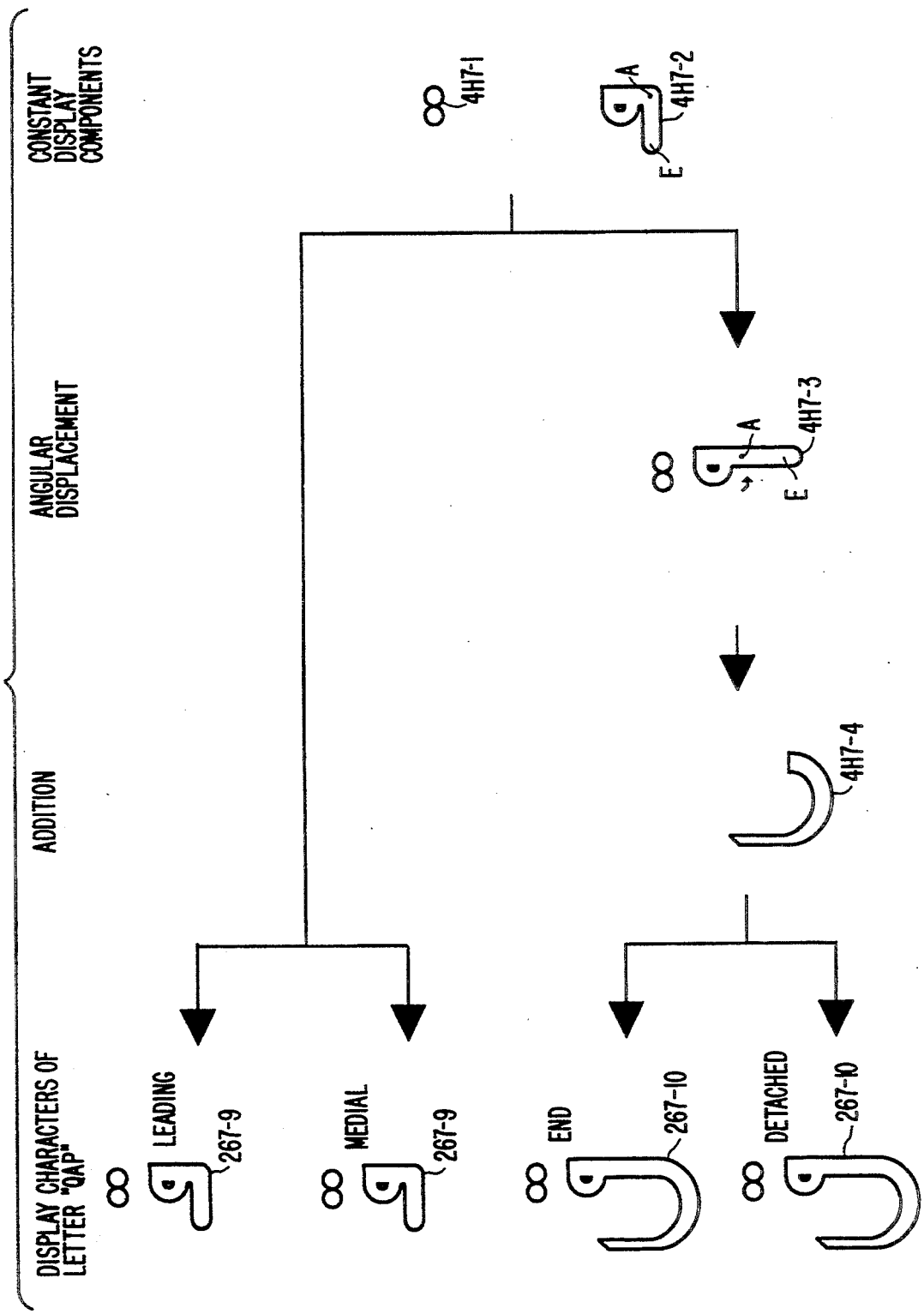
Figure 54:
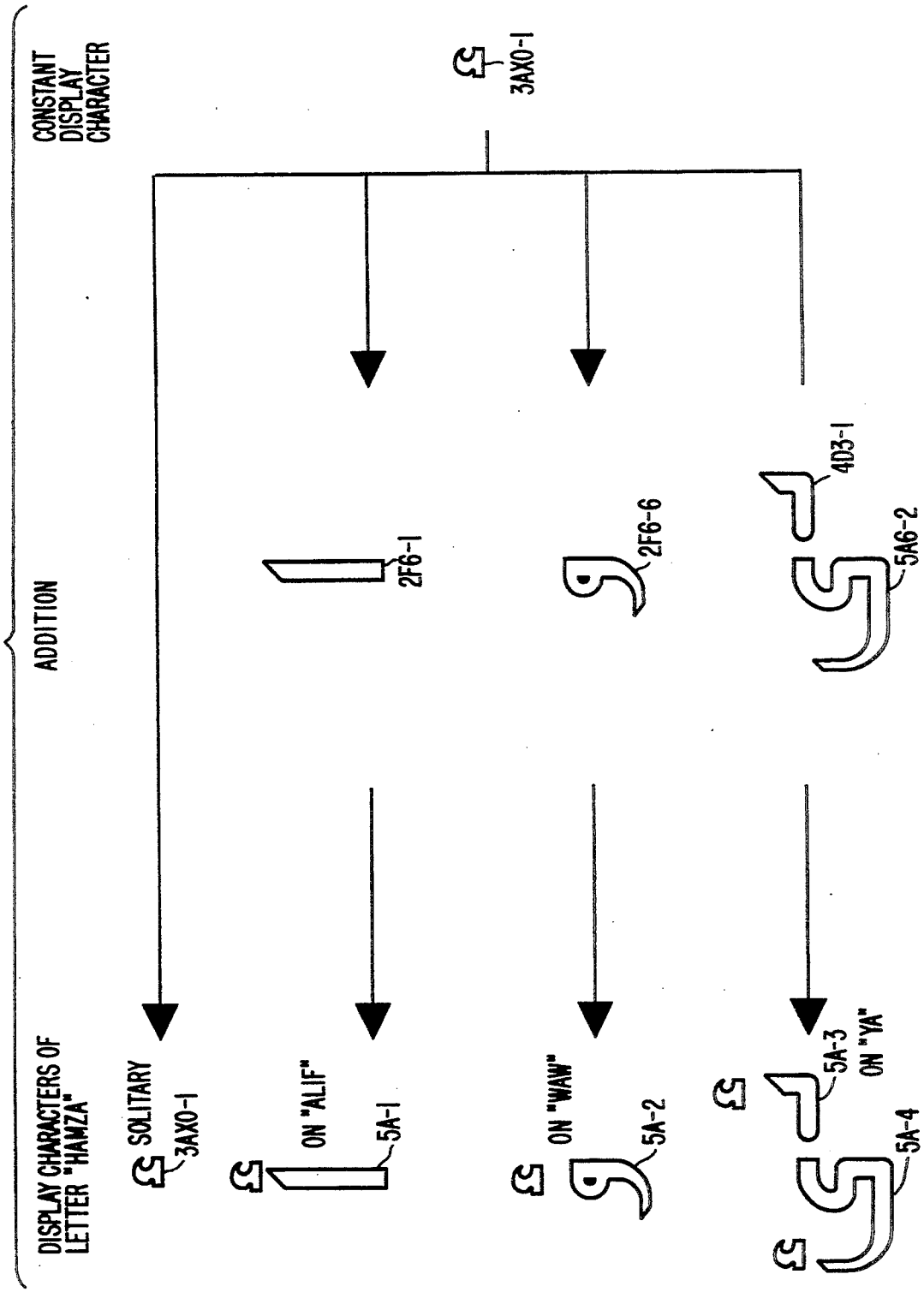

FIG. 4H (See also FIG. 1A (level 7), 1B (level 7), 1C (row 21) and FIG. 2G (in particular form 267-9 and 267-10).)

The Figure shows two constant display components 4H7-1, which is the same as 3X1-4, and 4H7-2. Component 4H7-2 incorporates a pivot A which provides for the pivotal attachment of element E to the rest of the component so as to enable the element to be varied in position and linked to display adjunct 4H7-4 as will be described hereafter.

Leading form and medial form 267-9 are identical and are formed by the combination of components 4H7-1 and 4H7-2. End form and detached form 267-10 are created by angular displacement of element E pivotably downwards to the version shown in FIG. 4H7-3 followed by placing the end of display adjunct 4H7-4 over the lower end of element E.

GENERATION OF EXTRA DISPLAY CHARACTERS

FIGS. 5A–5D show how the extra display characters described in connection with FIGS. 3A–3D are transformed where necessary.

Each of FIGS. 5A–5D take a common format. This is used whether or not changes in character form actually occur for a given letter in the way used in connection with the FIGS. 4A–4H. On the right hand side is shown the display component/s which is/are common to all display character forms of the letter. On the left hand side are shown, where relevant, examples of the leading, medial, end and detached forms of the letter involved. In the event of differences between a form shown on the left hand side and the constant display component/s on the right, the difference in form is achieved by one or more transformation steps applied to the component shown on the right. The transformation is achieved either by angular displacement of one or more pivoted element/s of the component and/or the addition of a display adjunct or display adjuncts. Any and all display adjuncts and any and all transformations are shown between the left and right hand items.

FIG. 5A (See also FIG. 1B (level 0) and FIG. 3A

As previously stated 'hamza' does not follow the usual alphabetic rules and is not related to any of the levels 1–7. FIG. 5A shows all the forms in which 'hamza' appears. These are not leading, medial, end and detached forms. The character form of 'hamza' is not governed by position with respect to other characters but rather on an understanding of Arabic grammar. Constant display component 3AX0-1 is not adapted to link to a previous display character or a following display character. It is adapted to combine with certain display components (much in the same way as the dots and stars). Adjuncts 5AG-1, 2F6-6, 4D3-1 and 5AG-2 follow the same linking rules when combined with 'hamza' as 2F6-1 and 2F6-6, 2C3-5 and 2C3-6 respectively. 5A6-2 is equivalent to 2C3-6 without the two circle component—see FIG. 5C below for the transformations producing this figure.

FIG. 5B

Figure 5B:
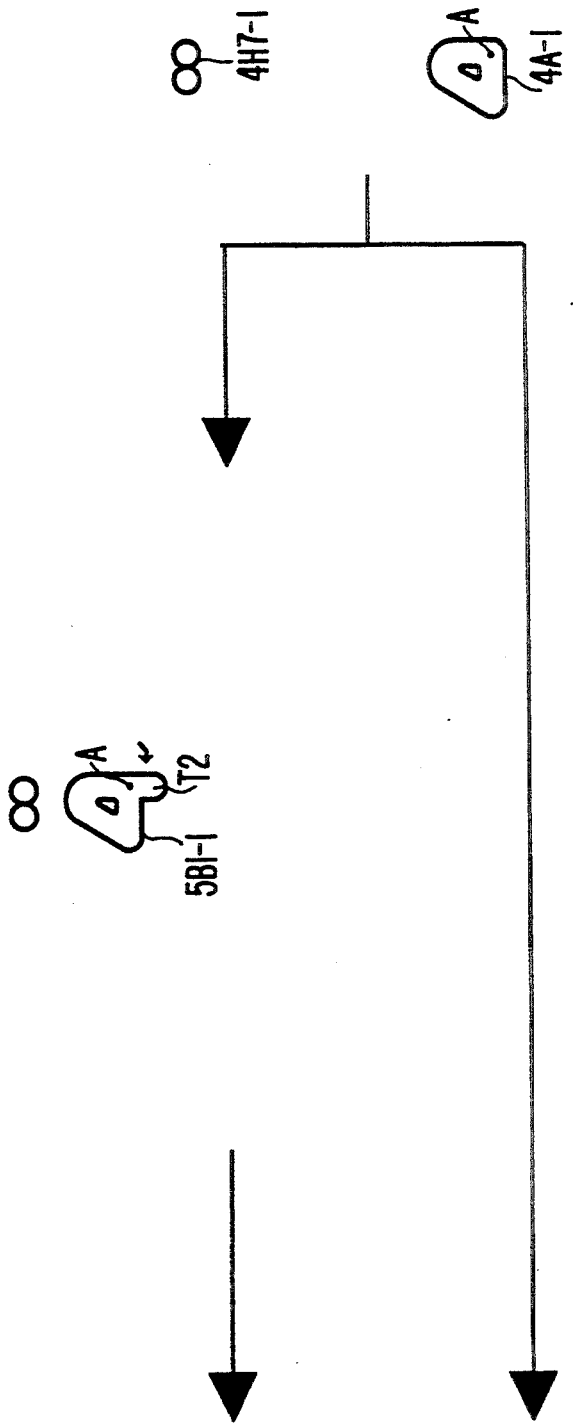
Figure 8:
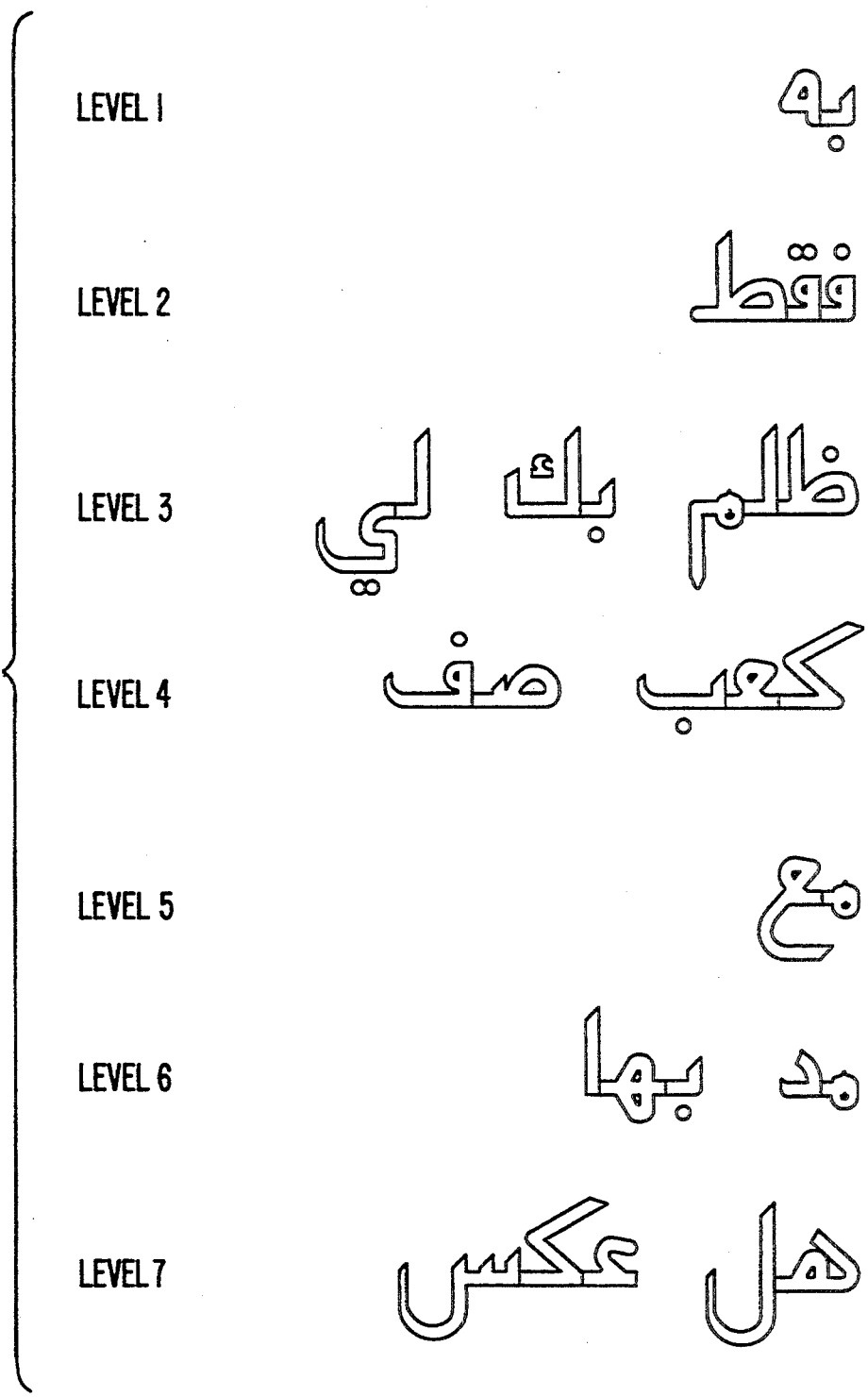
Figure 10:
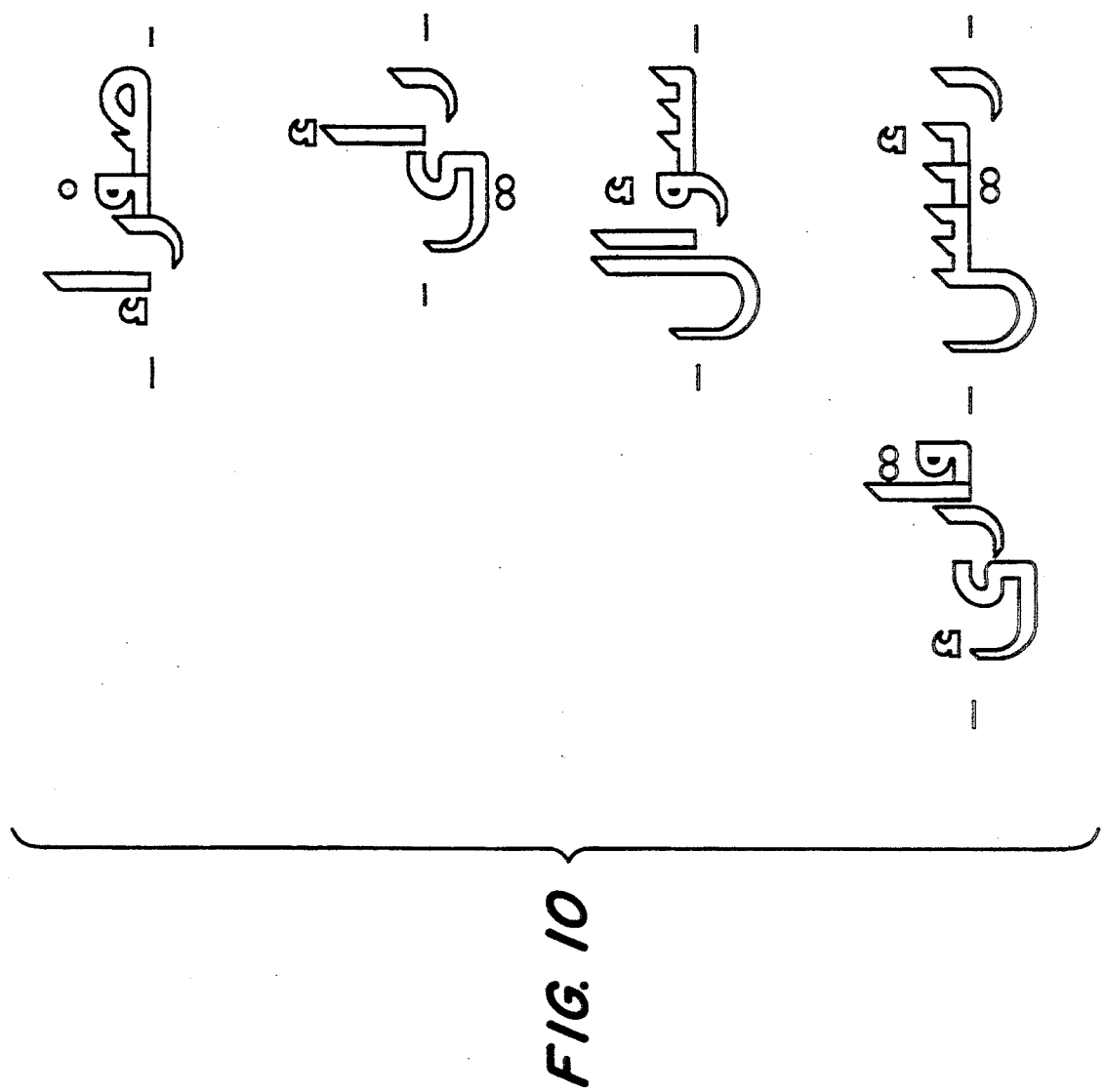

This shows components 4A-1 and 4H7-1 of 'ta-marbutah' combined to generate the detached form 5B1-3. With the extra angular displacement of element T2 as shown in FIG. 5B1-1 the end form 5B1-2 is generated.

It should be noted that the constant display component 4H7-1 is the same color as the display components of FIG. 4A. It should also be noted that display component 4H7-1 is only utilized in the display character forms of 'ta-marbutah'. The display character forms of 'ta-marbutah' with the end and detached display character forms of the letter 'ha' relates this letter to level 1.

5B1-2 and 5B1-3 follow the same linking rules as 2A1-3 and 2A1-4.

FIG. 5C

This shows constant display components 4D3-1, 4D3-3 and 4D3-4 which are combined to generate end form and detached form 5A-4 of 'alif-maksurah'. The similarity of 'alif-maksurah''s display character forms with the end and detached display character forms of the letter 'ya' relate this letter to level 3.

5A4 follows the same linking rules as 2C3-6.

FIG. 5D

This shows constant display component 267-11 which is transformed by angular rotation of element E see 5D7-1 to provide leading form, medial form, end form and detached form 3DX7-1 of 'lam alif'. While element E is aligned behind the vertical section of the component 267-11 it is concealed from view. It is colored differently from the remainder of the component but is the same color as the letter 'alif' shown in 2FG-1. Consequently the forms 3DX7-1 in which the element E is exposed, are bi-colored.

267-11 is equivalent to the constant display component of the character forms of the letter 'lam'. This associates this letter with level 7.

It should be noted that the character forms of this letter follow the same linking rules as characters associated with FIG. 1A, level 6, and FIG. 2F.

PRACTICAL FEATURES

The display characters described in connection with FIGS. 1A–1C, 2A–2G and 3A–3D are of rigid plastics material. All the display components hamza BX0/1, the 'hamza' shaped adjunct 3X3-1, and all display adjuncts incorporating circles (which henceforth will be referred to as the diacritical components) have a thickness of about one third that of the unit width of the components.

ELEMENTS

Typically a constant display component incorporates a pivoted element. The pivot can serve either to allow the angular alignment of the element to be varied relative to the remainder of the component in order to provide a means for linking other display characters or display adjuncts on a particular alignment with the original character, or to enable the element to be exposed only for certain display character forms while being over or under the rest of the component for other display character forms. When any element is aligned over or under the body of a component, the thickness of the body of the component over or under which the element is aligned and the thickness of the element adds together to form the same thickness as the remainder of the component.

ANGULAR DISPLACEMENT

In particular where translation involves angular displacement of an element, click stops (or stops at least limiting the range of rotation) can be incorporated to ensure that the alignment of an element is generally correct or at least cannot be located in an irrelevant range of positions. Even when there are two or more stop positions for a given element a learner will be encouraged to deduce the appropriate location for a given display character.

LINKAGE

All display characters excluding 'hamza', are adapted to permit linkage to a preceding display character (a display character positioned on its trailing side—i.e. the right hand side of a display character as viewed in FIGS. 1A, 2A–2G, 3B, 3C and 3D) by providing a shaped recess on the underside of the display character. This shaped recess, of a unit width square, is situated in such a way that it is positioned directly above the datum line when the display character is placed correctly in relation to it.

All leading and medial forms of the twenty-eight letter character set, excluding those corresponding to letters of level 6 of FIG. 1A and 2F6-1 to 2F6-6, are adapted to permit linkage to a following display character of the twenty-eight letter character set by a complementary shaped plug (hereafter referred to as a "hand") which can be placed under the shaped recess of the following display character.

The thickness of the shaped recess is equivalent to the thickness of a 'hand'. Typically this may be one third of the thickness of the display character. All shaped recesses are of a uniform dimension as are all 'hands'. This provides for a universal compatibility between any 'hand' of one display character and any shaped recess of another display character.

If necessary the linkage between a "hand" and a shaped recess can provide for retention and alignment by the shaped recess being provided with a square sectioned "male" projection which fits into a square sectioned "female" recess in the "hand". The male and female linkage can be adapted to provide an interference fit.

This linkage method demonstrates the correct position of linkage between two display characters, and helps in aligning the display characters along a datum line. It also permits a degree of handling while further display characters or adjuncts are added without the joined display characters becoming misaligned or separated.

Most importantly this linkage method does not permit any display characters of letters corresponding to level 6 in FIG. 1A, and FIG. 2F, that is to say those without hands, to be linked to a following display character.

It should be noted that the extra display characters of the total display character set, the 'hamza' is not adapted to link forwards. "Ta-marbutah' and 'alif-maksurah' do not have leading and medial forms. 'lam-alif' has leading, medial, end and detached character forms and behaves much in the same way as the characters of level 6 of FIGS. 1A and 2F6-1 to 2F6-6. It should be noted that the display character forms of 'ta-marbutah' and 'alif-maksurah' do not have 'hands' so that they cannot link to a following letter, whereas the display character of 'lam-alif' does have a 'hand' which is never used in linking forward.

Except for the case of 'lam-alif' no display character of the total display character set can ever be incorrectly linked to a following display character with this linkage system.

It should be noted that element T2 in FIG. 4A provides the shaped recess for linkage with a "hand" and can typically be two thirds the thickness of the component, when a 'hand' is one third the thickness.

DIACRITICAL COMBINATION

All diacritical components are made of clear plastic on which the diacritical marks are embossed.

The diacritical components do not link using the 'hand' recess mechanism. They are combined by placement in an appropriate position to their respective display characters.

WORD FORMATION—FIGS. 6 to 9

The foregoing descriptions relating to FIGS. 1A to C7 show how components of the display fount are transformed into display characters. Examples are now given of how the display characters are assembled to form visual displays of words analogous to printed or written words for the representation of any words appearing in the Arabic language.

Each of FIGS. 6 to 9 contains a number of examples of Arabic words. Where more than one word is given as an example in any row it is separated by a wider spacing. Each example has a three or four item identifier:

The first is a letter identifying the figure to which the drawing relates;

the second is a number referring to the level in FIG. 1A to which the display character form of the letter of concern is related—the exact form of the display character can be established from that drawing in the FIGS. B1–B7 (and where applicable FIGS. 4A–4H) which corresponds to the level of FIGS. 1A–1C; and the third is a number identifying the position in the word (counting the number of display characters from the right) of a display character which is to be noted.

Where more than one word is cited as an example in any row a letter suffix is also added.

LEADING DISPLAY FORMS—FIG. 6

This shows examples of leading display character forms. The position of the significant display character in each case is highligted by the second number. It will abe noted that the leading form is predominantly used in the beginning of a word although it can appear in the middle of a word when following any display character represented in FIG. 2F—corresponding to level 6 of FIG. 1A. Such an example can be seen in 6-5-3B. It could be argued that 6-6-1A and 6-6-1B show examples of detached forms. They have been included here since they are situated at the beginning of a word.

MEDIAL DISPLAY FORMS—FIG. 7

This shows examples of medial display character forms. 7-6-2 and 7-6-4 cite two examples in one word. It could be claimed that these two examples would be equally appropriate in the following table of End display character forms. They have been included here since they are situated in the middle of a word.

END DISPLAY FORMS—FIG. 8

This shows examples of end display character forms. In each case the end display character form is the last character of a word.

DETACHED DISPLAY FORMS—FIG. 9

This shows examples of detached display character forms. It should be noted that in each case the detached form is the last character of a word and is preceded by a display character corresponding to level 6 of FIG. 1A.

It should be noted that all words cited as examples in FIGS. 6 to 9 can be generated from the single character display fount in addition to display component 3X1-2.

EXTRA DISPLAY CHARACTER FORMS—FIGS. 10 to 13

FIG. 10 'HAMZA'

This shows examples of Arabic words with 'hamza' which does not follow rules of character form according to location within a word. In particular it does not have leading, medial, end and detached forms in the sense common to the character forms of the twenty-eight letter alphabet. It is usually not described independently as a member of the Arabic alphabet. Although it is a distinct letter as demonstrated by most Arabic dictionaries which prefix this letter to the twenty-eight letter alphabet. It should be noted that where 'hamza' appears with 'alif', 'ya' or 'waw' these characters behave as if 'hamza' was not present. It will also be noted that the hamza in combination with 'ya' does not use the two circle constant display component of the display characters of 'ya'.

FIG. 11 'TA-MARBUTAH'

This shows examples in Arabic words of end and detached forms of "ta-marbutah".

FIG. 12 'ALIF-MAKSURAH'

This shows examples in Arabic words of end and detached forms of "alif-maksurah".

FIG. 13 'LAM-ALIF'

This shows examples in Arabic words of leading, medial, end and detached forms of "lam-alif".

All words cited as examples in FIGS. 10 to 13 can be generated from the single character display fount in addition to display component 3AX0-1, 3X1-1 and 3X1-2.

Figure 11:
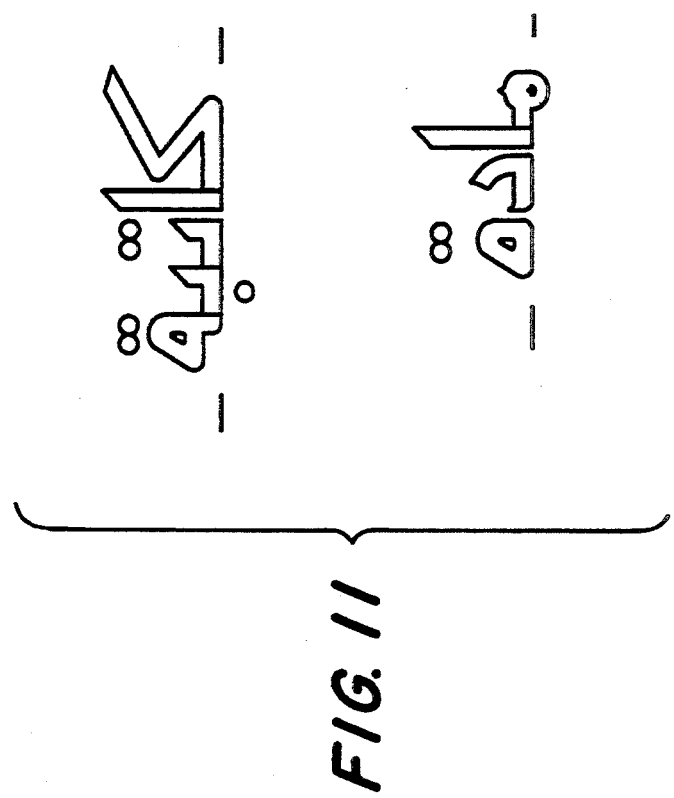
Figure 12:
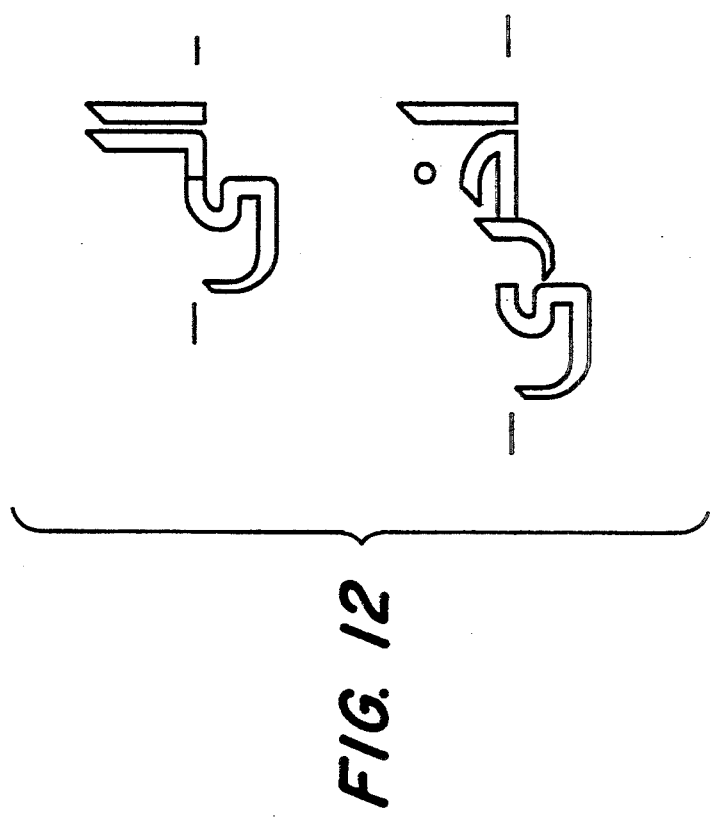
Figure 13:
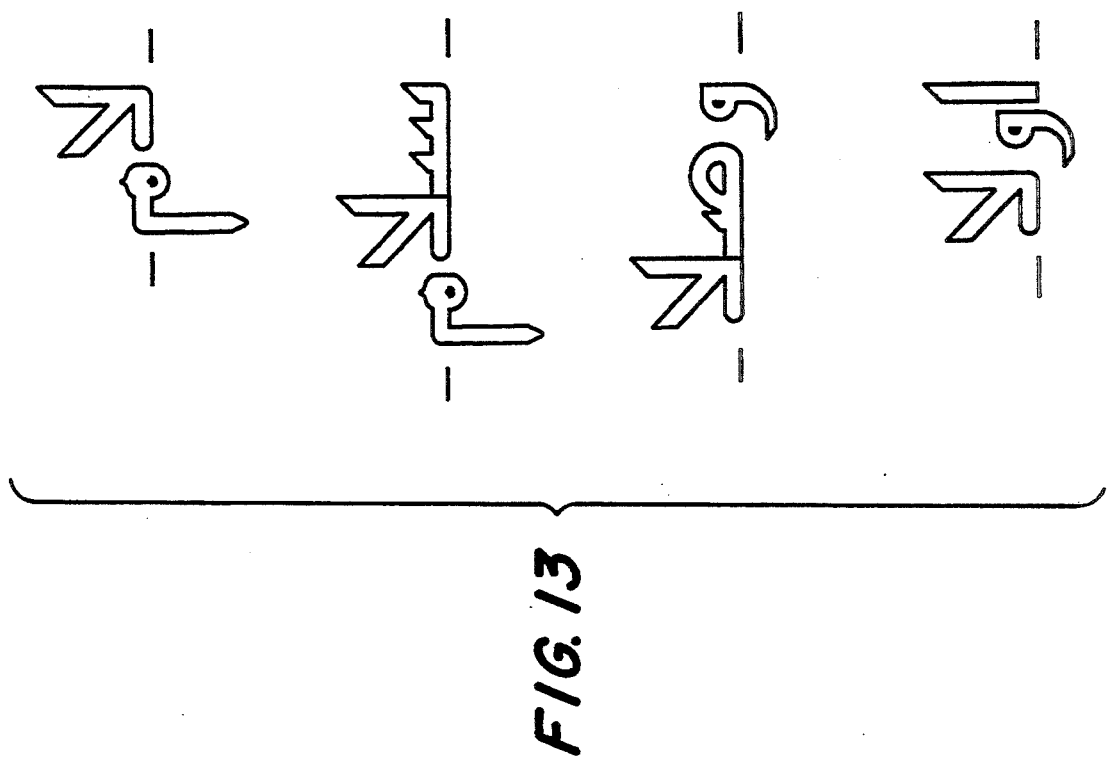

It should be noted that FIGS. 11 and 12 lack leading and medial character forms. This is one reason why 'ta-marbutah' and 'alif-maksurah' are not conventionally introduced with the 28 letter alphabet set.

'Lam-alif' as its name implies is a composite letter produced by the fusion of the letter 'lam' (267-11, 267-12) with 'alif' (2F6-1). These three letters 'ta-marbutah', 'alif-maksurah', and 'lam-alif' are therefore viewed as modified versions of 'ha', 'ya' and 'lam' combined with 'alif' respectively. This is another reason why they are not conventionally introduced with the 28 letter alphabet set.

When depicting the letter 'alif', 'hamza' is often incorrectly introduced into its character form. This is misleading as the 'alif' character form in association with 'hamza' no longer represents the letter 'alif'.

TEACHING APPLICATIONS

One substantial benefit from the invention is that the character form of a given letter can be taught as an evolutionary or progressive development from some original form so facilitating the comprehension of the character forms representing a given letter and the alphabet as a whole.

The constant display components are readily decorated or modelled, to a greater or lesser extent on their outer surface. Typically they can be readily decorated with faces to increase their appeal and/or identification for young learners.

If desired a display fount can be used as a three dimensional toy set or educational means for teaching the evolutionary or progressive development of the alphabet from some original form so facilitating the comprehension of the character forms of a given letter.

As a toy set the components of the display fount are engaging in themselves to children who need not even be aware of their intended use. Playing with the display components serves as a useful preliminary to the process of learning the alphabet. The display components can also be used as the medium through which to introduce the function of the characters of the alphabet.

The display characters have been designed in such a way as to be readily discussed with a child. Reference has already been made to the use of terms such as "hand" and "tails" which are concepts readily grasped by a child.

Any constant display component which is not a diacritical component can be readily anthropomorphasized by the addition of eyes and a mouth to the characters. In the example of display character forms of 'ain' and 'ghain' (see 2E5-11 to 2E5-14 and FIG. 4E) the transformation involved in medial and end forms can be explained in terms of shutting an "eye". All dots above the datum line can be referred to as "stars", dots below as "balls". All tails forms can be envisaged as characters holding a "tail" with a "hand". Letters in level 6 having no hands cannot therefore hold their friends or hold tails.

The character form 2C3-6 can be described as having a "tail" and wearing a "hat". Letter 2C3-2 can be described as holding a pencil and an embodiment of it can incorporate a pencil, pen or other writing or drawing instrument intrinsically with the display fount to encourage children to scribble.

By having "hands" linking into recesses under a display character of a following letter, successive letters can be easily assembled from right to left, one upon the next.

Such a system also highlights the point at which one display character ends and the next begins.

It will be noticed that the constant display components in all cases barring the letter "ha" are all that are required to produce the leading and medial forms of all the characters. This in turn helps the child to think in terms of a basic letter which is adapted or not as the case may be in its end and detached forms.

It will also be noticed that where there exist more than one constant display component for a given letter of the 28 letter alphabet only one display component carries a face and this is always a non-diacritical component. The face on a display component therefore distinguishes it as a constant display component. All components with stars or circles are constant display components.

Given that this alphabet display emphasizes the generation from one character into another. The complete character set can be explained in terms of modification of the characters displayed in FIG. 1A. This allows for a reduced emphasis on the tabular four fold presentation of characters typified by FIG. 1C which can seem very daunting to a beginner.

An important benefit of the present exemplary embodiments is that it serves to emphasize the distinction between the character represented by 2C3-5, the group of characters represented by 2D4-1, 2D4-3 and 2D4-5 and the character represented by 267-13. These five characters have a similar distinctive feature in the main body of the character and are only distinguishable by their number and positioning of circles.

The display characters of 2C3-5 is given an extra distinctive identify through its color which is distinct from the other characters just mentioned.

Likewise display character 267-13 is also a distinct color and furthermore is hinged unlike the rest. This helps alleviate the problems of distinguishing between these letters at the learning stage.

The display components of this display fount can easily be adapted to have a magnetic insert allowing for use with a metallic base board on which a datum line can be shown or on which certain template shapes of words can be illustrated.

The system of presentation of the display characters is not limited to a three dimensional plastic toy. It is readily adaptable into other media. For example the display characters or the display font may be represented on a computer display screen where they can be combined to produce words.

As mentioned earlier the display fount is readily adaptable to the Persian script. This would require an additional five distinct display adjuncts to form the letters 'gaf', 'pe', 'che', 'zhe' corresponding to levels 3, 4, 5 and 6 respectively. In the case of levels 4, 5 and 6 this would require display adjuncts on clear mountings with three dots to be used below the datum line, three dots below the datum line and three dots above the datum line respectively. In the case of level 3 an extra "tail" of a similar type to 2D4-5 would be required in addition to a long dash on a clear mounting which would locate in element I of character 4C1.

The physical manifestation of the alphabet can be provided in a complete alphabet set of 28 characters together with the 3 extra display adjuncts allowing for the generation of 62 display characters forms of the total alphabet set. Otherwise to provide a total set of display characters which did not transform one would have to have a set of 62 separate characters.

Colors can be used to distinguish between the members of each level of the pyramid shown in FIGS. 1A and 1B, corresponding to FIGS. 2A–2G, and 'hamza'. The use of different colors serves to emphasize similarities and differences between the forms of the characters in a given level and between levels as exemplified in the following summary. 'hamza' this does not follow any regular display character linking rule.

Level 1

Letter 'ha' has very dissimilar character forms. The position at which it links to a previous character is not fixed. It also lacks a tail form in its end and detached forms unlike letters in levels 3, 4, 5 and 7. It is the only letter represented by its leading form in the single character alphabet.

Level 2

These letters have a constant character form reminiscent of character forms of level 6. They differ however in their ability to link forward. They also do not have tail forms.

Levels 3

The end and detached character forms of these letter are each unique.

Level 4

The tails of the end and detached character forms of these letters are unique to this group of letters.

Level 5

The tails of the end and detached character forms of these letters are unique to this group of letters.

Level 6

These letters have constant character forms. None of these letters has a hand. None has a tail.

Level 7

The tails of the end and detached character forms of these letters are unique to this group of letters.

Color coding serves to distinguish the 'hamza' and the members of the seven levels. This not only helps in distinguishing the roles and forms of the characters of different letters but also helps facilitate in the location of display components required to generate a given character. In addition where the colors of successive display characters used to display a given word are different the component display characters making up the word can be readily distinguished.

Beginners learning the Arabic script often make the mistake of trying to link character forms of letters corresponding to level 6 to a following character. The display characters of the exemplary embodiment make this physically impossible since they do not have 'hands'.

Another problem for beginners is attempting to join characters together at incorrect relative positions and angles. The use of a linkage system with 'hands' locating in shaped recesses minimizes such mistakes.

Given the correct linkage of linkable characters to one another the problem of correctly placing characters relative to a datum line are largely solved.

The described sets of display characters can also be used in conjunction with a template where the outline of a display character or groups thereof to form words can be recessed to receive the display adjuncts. This prevents any mistakes in joining position and location relative to the datum line, especially of the diacritical components. The templates can be of a simple nature such as a colored reproduction of a word over which the display components are placed.

The display characters used in the accompanying Figures, while collectively representing a new Arabic type face, conform in their relative proportions, ascenders and descenders to classical calligraphic rules. As such they are beneficial in instilling into a beginner a correct sense of proportion of the Arabic characters.

The display fount exemplified allows for the generation of the characters referred to in the BX and CX series of figures which characters are often ignored when teaching the characters of the alphabet.

The arrangement of the single character alphabet set according to the arrangement shown in FIG. 1A allows for these more complicated characters referred to in the series of FIGS. 3A–3D and 5A–5D to be initially omitted when teaching a beginner and for their introduction at a later stage of instruction.

The relationship between some of the characters appearing in FIG. 3B, 3C and 3D between characters of the 28 letter alphabet is highlighted. In the case of 3DX7-1 the character displays its relationship with characters 2G7-11 and 2F6-1 through the use of both the constant display component of 267-11 and the color of 2F6-1 its hinged element.

The display character "hamza" is a very confusing letter for beginners as well as those with some mastery of Arabic script. Here it is clearly distinguished from the 'hamza' shaped display component corresponding to the addition character of FIG. 4C by color.

The diacritical marks are mounted on clear plastic to form the diacritical components. This has been done so as to make them more manageable in the cases where there are diacritical marks grouped together (i.e. two dots, three stars, etc.); also this maximizes the size of the diacritical components.

It should be noted that the single character display fount in addition to 3AX0-1, 3X1-1 and 3X1-2 display components forms a convenient set of display fount components to enable many Arabic words to be displayed. This could form the basic set of components to be provided in a toy set. Further display components of the display fount may of course be added for more comprehensive sets.

I claim:

1. A method of representing characters, C in number, of an alphabet numbering L letters (where $C>L$) by way of display characters generated from display components among which M (where $M<L$) of the display characters per se are represented by corresponding display components; and among which the remaining N characters (where $N=C-M$) are unrepresented; the M display characters being part of a display fount the display components of which are adapted for being associated to generate the N remaining display characters, said N remaining display characters being formed by the association of display components other than by the association of two or more of the said display components which represent the M display characters per se.

2. A method as claimed in claim 1 including a step of linking a display character to a following display character by way of a linkage to which both the display character and the following display character contribute, whereby the adjacent characters are then linked or juxtaposed correctly according to rules associated with the alphabet on which the characters are based.

3. A method as claimed in claim 1 wherein the association step involves either:
  1) the connection of two or more display components; or
  2) the angular displacement of an element relative to the remainder of the component; or
  3) both connection and angular displacement as aforesaid.

4. A display fount of display components for representing characters, C in number, of an alphabet numbering L letters (where $C>L$) by way of display characters generated from said display components among which M (where $M<L$) of the display characters per se are represented by corresponding display components; and the remaining N characters (where $N=C-M$) are unrepresented; the display components which represent the M display characters per se being a part of the display fount the display components of which are adapted for being associated to generate the N remaining display characters, said display components having shapes for forming said N remaining display characters by association of display components other than by the association of two or more of said display components which represent the M display characters per se.

5. A display fount as claimed in claim 4 wherein at least some of the display components incorporate linking means whereby a display character can be linked to a preceding display character, whereby the adjacent characters are then linked or juxtaposed correctly according to rules associated with the alphabet on which the characters are based.

6. A display fount as claimed in claim 4 in which at least some of the display components are adapted for association by incorporating:
  1) a coupling whereby a display component can be connected with another display component; or
  2) an element which can be angularly displaced relative to the remainder of the said display component of which the element forms a part; or
  3) both a coupling and an element as aforesaid.

* * * * *